United States Patent
Siminoff

(10) Patent No.: US 11,545,013 B2
(45) Date of Patent: Jan. 3, 2023

(54) CUSTOMIZABLE INTRUSION ZONES FOR AUDIO/VIDEO RECORDING AND COMMUNICATION DEVICES

(71) Applicant: A9.com, Inc., Palo Alto, CA (US)

(72) Inventor: James Siminoff, Pacific Palisades, CA (US)

(73) Assignee: A9.Com, Inc., Palo Alto, CA (US)

( * ) Notice: Subject to any disclaimer, the term of this patent is extended or adjusted under 35 U.S.C. 154(b) by 0 days.

(21) Appl. No.: 15/794,001

(22) Filed: Oct. 26, 2017

(65) Prior Publication Data

US 2018/0114421 A1    Apr. 26, 2018

Related U.S. Application Data

(60) Provisional application No. 62/413,378, filed on Oct. 26, 2016.

(51) Int. Cl.
*G08B 13/196* (2006.01)
*H04N 7/18* (2006.01)

(52) U.S. Cl.
CPC ... *G08B 13/19615* (2013.01); *G08B 13/1968* (2013.01); *G08B 13/19606* (2013.01);
(Continued)

(58) Field of Classification Search
CPC .......... G08B 13/19602; G08B 13/1968; G06T 2207/30232; G06T 2200/24; G06T 7/20; H04N 7/181; H04N 7/18
See application file for complete search history.

(56) References Cited

U.S. PATENT DOCUMENTS 3,653,044 A * 3/1972 Breeze ................... G01S 7/298
                                                        342/185
4,249,207 A * 2/1981 Harman ............. G06K 9/00771
                                                        340/541
(Continued)

FOREIGN PATENT DOCUMENTS

CA    2511886 A1 * 1/2006 ............. G05B 15/02
CA    2814294       10/2014
(Continued)

OTHER PUBLICATIONS

Ahn, Jeong Hwan, International Search Report and Written Opinion of the International Searching Authority for PCT/US/2017/058383, dated Apr. 5, 2018, International Application Division, Korean Intellectual Property Office, Republic of Korea.
(Continued)

*Primary Examiner* — Stuart D Bennett
(74) *Attorney, Agent, or Firm* — Lee & Hayes, P.C.

(57) ABSTRACT

Customizable intrusion zones for audio/video (A/V) recording and communication devices in accordance with various embodiments of the present disclosure are provided. In one embodiment, a method for an A/V recording and communication device is provided, the method comprising displaying, on a display of the computing device, a user interface for creating and/or customizing at least one intrusion zone, wherein the at least one intrusion zone comprises at least one motion zone within a field of view of the A/V recording and communication device coupled with at least one conditional setting of the at least one motion zone, determining whether an input has been received to establish a new conditional setting, or to change a previous conditional setting, determining whether an input has been received to save the new conditional setting or to save the changed conditional set-
(Continued)

ting, and saving the new conditional setting or the changed conditional setting.

20 Claims, 31 Drawing Sheets

(52) U.S. Cl.
CPC .. *G08B 13/19619* (2013.01); *G08B 13/19628* (2013.01); *G08B 13/19636* (2013.01); *G08B 13/19658* (2013.01); *G08B 13/19682* (2013.01); *G08B 13/19684* (2013.01); *H04N 7/186* (2013.01); *G08B 13/19669* (2013.01); *G08B 13/19697* (2013.01)

(56) References Cited

U.S. PATENT DOCUMENTS

| | | | | |
|---|---|---|---|---|
| 4,258,255 | A | * | 3/1981 | Guscott ............... G08B 13/193 250/221 |
| 4,288,867 | A | * | 9/1981 | Guthart ............. G08B 13/1609 367/93 |
| 4,321,594 | A | * | 3/1982 | Galvin ............... G08B 13/193 340/567 |
| 4,347,590 | A | * | 8/1982 | Heger ..................... G02B 7/40 340/691.1 |
| 4,551,711 | A | * | 11/1985 | Akiyama ............. G08B 13/19 250/342 |
| 4,737,847 | A | * | 4/1988 | Araki ............. G08B 13/19602 348/161 |
| 4,764,953 | A | | 8/1988 | Chern et al. |
| 4,940,987 | A | * | 7/1990 | Frederick ............ G01S 13/951 342/26 D |
| 5,026,990 | A | * | 6/1991 | Marman ............... G08B 13/19 250/342 |
| 5,091,780 | A | | 2/1992 | Pomerleau |
| 5,151,945 | A | * | 9/1992 | Lee ................. G08B 13/19602 348/155 |
| 5,276,427 | A | * | 1/1994 | Peterson ........... G08B 13/2494 340/506 |
| 5,311,024 | A | * | 5/1994 | Marman ............. G08B 13/193 250/342 |
| 5,382,943 | A | | 1/1995 | Tanaka |
| 5,416,725 | A | | 5/1995 | Pacheco et al. |
| 5,428,388 | A | | 6/1995 | von Bauer et al. |
| 5,467,402 | A | * | 11/1995 | Okuyama ............... G06K 9/00 348/161 |
| 5,493,273 | A | * | 2/1996 | Smurlo ................. G08B 29/16 340/309.16 |
| 5,541,414 | A | * | 7/1996 | Hori ..................... G08B 13/191 250/349 |
| 5,641,963 | A | * | 6/1997 | Mueller ............... G08B 13/193 250/342 |
| 5,666,157 | A | * | 9/1997 | Aviv ............... G08B 13/19602 348/150 |
| 5,708,436 | A | * | 1/1998 | Loiz ..................... G01S 13/90 342/25 A |
| 5,760,848 | A | | 6/1998 | Cho |
| 5,822,077 | A | * | 10/1998 | Sasaki ............... H04N 1/00885 358/296 |
| 5,822,542 | A | | 10/1998 | Smith et al. |
| 5,828,848 | A | * | 10/1998 | MacCormack .. G08B 13/19604 709/247 |
| 5,936,666 | A | * | 8/1999 | Davis .................... G08B 13/193 348/143 |
| 5,966,074 | A | * | 10/1999 | Baxter ............. G08B 13/19602 340/541 |
| 5,999,634 | A | * | 12/1999 | Abbott ............... G06K 9/00771 348/140 |
| 6,035,341 | A | | 3/2000 | Nunally et al. |
| 6,049,353 | A | | 4/2000 | Gray |
| 6,061,014 | A | * | 5/2000 | Rautanen ............... G01S 13/56 342/28 |
| 6,072,402 | A | | 6/2000 | Kniffin et al. |
| 6,144,405 | A | * | 11/2000 | Toba ..................... H04N 5/145 348/155 |
| 6,150,658 | A | * | 11/2000 | Hagiwara ............. G01J 5/0022 250/338.1 |
| 6,192,257 | B1 | | 2/2001 | Ray |
| 6,208,248 | B1 | * | 3/2001 | Ross ..................... G01S 7/2922 340/552 |
| 6,211,522 | B1 | * | 4/2001 | Kotlicki ................. G02B 3/005 250/353 |
| 6,271,752 | B1 | | 8/2001 | Vaios |
| 6,307,622 | B1 | * | 10/2001 | Lewis ..................... G01S 17/08 356/4.01 |
| 6,359,560 | B1 | * | 3/2002 | Budge ............. G08B 13/19602 340/506 |
| 6,429,893 | B1 | | 8/2002 | Xin |
| 6,456,322 | B1 | | 9/2002 | Marinacci |
| 6,462,663 | B1 | * | 10/2002 | Wilson ............... G08B 21/0415 250/342 |
| 6,476,858 | B1 | | 11/2002 | Ramirez Diaz et al. |
| 6,493,041 | B1 | * | 12/2002 | Hanko ................... H04N 5/144 348/169 |
| 6,546,322 | B2 | | 4/2003 | Williams |
| 6,628,835 | B1 | * | 9/2003 | Brill ................... G06K 9/00335 348/155 |
| 6,633,231 | B1 | | 10/2003 | Okamoto et al. |
| 6,658,091 | B1 | | 12/2003 | Naidoo et al. |
| 6,707,486 | B1 | * | 3/2004 | Millet ..................... H04N 7/18 250/340 |
| 6,727,938 | B1 | * | 4/2004 | Randall ............. G08B 13/19602 348/143 |
| 6,753,774 | B2 | | 6/2004 | Pan et al. |
| 6,922,145 | B2 | * | 7/2005 | Piesinger ................ G01S 7/415 340/506 |
| 6,940,998 | B2 | | 9/2005 | Garoutte |
| 6,970,183 | B1 | | 11/2005 | Monroe |
| 6,977,609 | B2 | * | 12/2005 | Pleva ..................... H01Q 13/10 342/28 |
| 7,008,063 | B2 | * | 3/2006 | Porter ..................... G02B 13/08 340/556 |
| 7,035,430 | B2 | * | 4/2006 | Ito .................... G08B 13/19602 348/169 |
| 7,062,291 | B2 | | 6/2006 | Ryley et al. |
| 7,065,196 | B2 | | 6/2006 | Lee |
| 7,075,431 | B2 | * | 7/2006 | Buckley ..................... G01J 5/34 250/342 |
| 7,084,761 | B2 | * | 8/2006 | Izumi ..................... G01S 13/04 340/541 |
| 7,085,361 | B2 | | 8/2006 | Thomas |
| 7,095,321 | B2 | | 8/2006 | Primm et al. |
| 7,109,860 | B2 | | 9/2006 | Wang |
| 7,193,644 | B2 | | 3/2007 | Carter |
| 7,304,572 | B2 | | 12/2007 | Sheynman et al. |
| 7,382,249 | B2 | | 6/2008 | Fancella |
| 7,430,186 | B1 | * | 9/2008 | Kim ......................... H04Q 9/00 340/539.22 |
| 7,450,638 | B2 | | 11/2008 | Iwamura |
| 7,468,662 | B2 | * | 12/2008 | Velipasalar ...... G08B 13/19615 340/506 |
| 7,522,745 | B2 | * | 4/2009 | Grasso ..................... G06T 5/00 351/210 |
| 7,543,327 | B1 | | 6/2009 | Kaplinsky |
| 7,545,953 | B2 | * | 6/2009 | Lai ................... G08B 13/19613 348/152 |
| 7,643,056 | B2 | | 1/2010 | Silsby |
| 7,646,329 | B2 | * | 1/2010 | Britton ................... G01S 7/2923 342/28 |
| 7,674,052 | B2 | * | 3/2010 | Hirooka ........... G08B 13/19652 396/439 |
| 7,683,924 | B2 | | 3/2010 | Oh et al. |
| 7,683,929 | B2 | | 3/2010 | Elazar et al. |
| 7,683,940 | B2 | * | 3/2010 | Fleming ................... G11B 27/34 348/222.1 |
| 7,738,917 | B2 | | 6/2010 | Ryley et al. |
| 7,777,780 | B2 | | 8/2010 | Oya et al. |
| 7,825,792 | B2 | | 11/2010 | Buehler |

(56) References Cited

U.S. PATENT DOCUMENTS

| | | | |
|---|---|---|---|
| 7,880,668 B1* | 2/2011 | Krause | G01S 7/40 342/75 |
| 7,929,016 B2* | 4/2011 | Yoshida | H04N 5/23299 348/159 |
| 7,973,701 B2* | 7/2011 | Lohmeier | G01S 13/931 342/89 |
| 8,035,505 B2 | 10/2011 | Ogiyama | |
| 8,139,098 B2 | 3/2012 | Carter | |
| 8,144,183 B2 | 3/2012 | Carter | |
| 8,154,581 B2 | 4/2012 | Carter | |
| 8,169,356 B2* | 5/2012 | Wu | G01S 13/56 342/28 |
| 8,305,447 B1* | 11/2012 | Wong | G08B 13/19602 348/151 |
| 8,560,128 B2* | 10/2013 | Ruff | G06F 1/3265 700/278 |
| 8,619,136 B2 | 12/2013 | Howarter et al. | |
| 8,711,217 B2* | 4/2014 | Venetianer | G08B 31/00 348/143 |
| 8,872,915 B1 | 5/2014 | Scalisi et al. | |
| 8,780,201 B1 | 7/2014 | Scalisi et al. | |
| 8,817,102 B2 | 8/2014 | Saeki et al. | |
| 8,823,795 B1 | 9/2014 | Scalisi et al. | |
| 8,842,180 B1 | 9/2014 | Kasmir et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,294 B1 | 4/2015 | Trundle | |
| 9,013,575 B2 | 4/2015 | Scalisi | |
| 9,049,352 B2* | 6/2015 | Scalisi | H04M 11/025 |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Scalisi | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,170,707 B1 | 10/2015 | Laska et al. | |
| 9,172,913 B1* | 10/2015 | Johnston | G06K 9/2036 |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi | |
| 9,179,108 B1 | 11/2015 | Scalisi | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2* | 1/2016 | Kasmir | H04N 5/33 |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,353,965 B1* | 5/2016 | Goyal | H04L 12/2823 |
| 9,454,820 B1 | 9/2016 | Kirmani et al. | |
| 9,508,239 B1 | 11/2016 | Harrison et al. | |
| 9,626,580 B2 | 4/2017 | Gupta et al. | |
| 9,628,286 B1 | 4/2017 | Nguyen | |
| 9,639,760 B2* | 5/2017 | Ottlik | G06K 9/46 |
| 9,672,727 B1 | 6/2017 | Alexander et al. | |
| 9,704,040 B2* | 7/2017 | Maruyama | G06K 9/00624 |
| 9,736,284 B2 | 8/2017 | Scalisi et al. | |
| 9,743,049 B2 | 8/2017 | Scalisi et al. | |
| 9,769,435 B2* | 9/2017 | Scalisi | G08B 13/19684 |
| 9,786,133 B2 | 10/2017 | Harrison et al. | |
| 9,799,183 B2 | 10/2017 | Harrison et al. | |
| 9,799,184 B2* | 10/2017 | Chen | G08B 13/1627 |
| 9,892,606 B2* | 2/2018 | Venetianer | H04N 7/181 |
| 9,894,328 B2* | 2/2018 | Siminoff | H04N 7/186 |
| 9,928,707 B2 | 3/2018 | Naylor | |
| 9,939,528 B2* | 4/2018 | Yamazaki | G01S 7/51 |
| 9,976,895 B2* | 5/2018 | Miura | G01J 1/0271 |
| 10,223,619 B2* | 3/2019 | Urashita | G06K 9/66 |
| 10,480,996 B2* | 11/2019 | Roberts | F21S 8/026 |
| 2002/0008758 A1* | 1/2002 | Broemmelsiek | G08B 13/19686 348/143 |
| 2002/0044082 A1* | 4/2002 | Woodington | G01S 7/023 342/70 |
| 2002/0067287 A1* | 6/2002 | Delcheccolo | G01S 7/06 340/901 |
| 2002/0094111 A1 | 7/2002 | Puchek et al. | |
| 2002/0147982 A1 | 10/2002 | Naidoo et al. | |
| 2002/0163577 A1* | 11/2002 | Myers | G08B 13/19643 348/152 |
| 2003/0025599 A1* | 2/2003 | Monroe | G08B 13/19684 340/531 |
| 2003/0043047 A1 | 3/2003 | Braun | |
| 2003/0085998 A1 | 5/2003 | Ramirez-Diaz et al. | |
| 2003/0163289 A1 | 8/2003 | Whelan et al. | |
| 2003/0206239 A1* | 11/2003 | Battles | H04N 1/00352 348/333.02 |
| 2004/0032494 A1 | 2/2004 | Ito et al. | |
| 2004/0036603 A1 | 2/2004 | Bingham | |
| 2004/0046795 A1* | 3/2004 | Josephson | G06F 3/011 715/764 |
| 2004/0082342 A1* | 4/2004 | Toguchi | G01S 13/426 455/456.1 |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2004/0141633 A1 | 7/2004 | Horie | |
| 2004/0155963 A1 | 8/2004 | Kondo et al. | |
| 2004/0161133 A1 | 8/2004 | Elazar et al. | |
| 2004/0227817 A1* | 11/2004 | Oya | G06F 3/017 348/155 |
| 2004/0246123 A1* | 12/2004 | Kawabe | G08B 13/19673 340/506 |
| 2005/0024208 A1* | 2/2005 | Maki | G08B 13/2497 340/545.3 |
| 2005/0040947 A1* | 2/2005 | Buckley | G01J 5/34 340/567 |
| 2005/0046699 A1 | 3/2005 | Oya et al. | |
| 2005/0073585 A1* | 4/2005 | Ettinger | H04N 7/18 348/155 |
| 2005/0078183 A1 | 4/2005 | Yoshimura et al. | |
| 2005/0111660 A1 | 5/2005 | Hosoda | |
| 2005/0116171 A1* | 6/2005 | Lee | F21S 8/033 250/342 |
| 2005/0156737 A1* | 7/2005 | Al-Khateeb | G08B 13/19634 340/541 |
| 2005/0169367 A1 | 8/2005 | Venetianer | |
| 2005/0174350 A1* | 8/2005 | Ridenour | G08G 5/0091 345/440 |
| 2005/0207487 A1* | 9/2005 | Monroe | G08B 13/19693 375/240.01 |
| 2005/0231352 A1* | 10/2005 | DiPoala | G08B 29/18 340/521 |
| 2005/0259158 A1* | 11/2005 | Jacob | H04N 5/3456 348/218.1 |
| 2005/0280704 A1 | 12/2005 | Clare et al. | |
| 2005/0285941 A1 | 12/2005 | Haigh et al. | |
| 2006/0010199 A1 | 1/2006 | Brailean et al. | |
| 2006/0022816 A1 | 2/2006 | Yukawa | |
| 2006/0028556 A1* | 2/2006 | Bunn | G10L 15/25 348/211.99 |
| 2006/0045354 A1* | 3/2006 | Hanna | G06K 9/00771 382/224 |
| 2006/0139449 A1 | 6/2006 | Cheng et al. | |
| 2006/0155851 A1 | 7/2006 | Ma et al. | |
| 2006/0156361 A1 | 7/2006 | Wang et al. | |
| 2006/0170769 A1 | 8/2006 | Zhou | |
| 2006/0171453 A1 | 8/2006 | Rohlfing et al. | |
| 2006/0179463 A1 | 8/2006 | Chisholm et al. | |

(56) References Cited

U.S. PATENT DOCUMENTS

| | | | |
|---|---|---|---|
| 2006/0215030 A1* | 9/2006 | Shih | G08B 13/19652 348/155 |
| 2006/0227997 A1 | 10/2006 | Au et al. | |
| 2006/0238618 A1* | 10/2006 | Wren | G08B 13/196 348/155 |
| 2006/0239645 A1* | 10/2006 | Curtner | H04N 7/181 386/228 |
| 2006/0242186 A1 | 10/2006 | Hurley | |
| 2007/0008081 A1 | 1/2007 | Tylicki et al. | |
| 2007/0014439 A1 | 1/2007 | Ando | |
| 2007/0018106 A1 | 1/2007 | Zhevelev et al. | |
| 2007/0018884 A1* | 1/2007 | Adams | G01S 13/003 342/147 |
| 2007/0035622 A1* | 2/2007 | Hanna | G06K 9/00771 348/143 |
| 2007/0139258 A1* | 6/2007 | Tsai | G01S 7/2922 342/159 |
| 2007/0162248 A1* | 7/2007 | Hardin | G08B 13/19641 702/142 |
| 2007/0176765 A1* | 8/2007 | Babich | G08B 29/183 340/522 |
| 2007/0223808 A1 | 9/2007 | Kerr | |
| 2007/0252693 A1* | 11/2007 | Janson | G08B 13/1961 340/541 |
| 2007/0279215 A1 | 12/2007 | Tomooka et al. | |
| 2007/0296813 A1* | 12/2007 | Hsieh | H04N 7/18 348/143 |
| 2008/0029703 A1* | 2/2008 | DiPoala | G08B 29/183 250/342 |
| 2008/0100704 A1* | 5/2008 | Venetianer | G08B 29/188 348/143 |
| 2008/0209505 A1 | 8/2008 | Ghai et al. | |
| 2008/0211906 A1 | 9/2008 | Lovric | |
| 2008/0244409 A1* | 10/2008 | Millar | G06F 3/04845 715/719 |
| 2008/0303903 A1* | 12/2008 | Bentley | G08B 13/19656 348/143 |
| 2008/0317286 A1* | 12/2008 | Thorpe | G08B 13/19615 382/103 |
| 2009/0002157 A1* | 1/2009 | Donovan | H04N 7/18 340/540 |
| 2009/0022362 A1 | 1/2009 | Gagvani et al. | |
| 2009/0079563 A1* | 3/2009 | Tsuji | G01V 8/005 340/552 |
| 2009/0102668 A1* | 4/2009 | Thompson | A01K 15/023 340/573.3 |
| 2009/0219388 A1* | 9/2009 | Zisa | H04N 5/33 348/143 |
| 2009/0227997 A1 | 9/2009 | Wang | A61B 18/24 606/10 |
| 2009/0237509 A1* | 9/2009 | Saxon | H04N 7/183 348/155 |
| 2009/0276705 A1* | 11/2009 | Ozdemir | G06K 9/00771 715/708 |
| 2009/0295923 A1* | 12/2009 | Moore | G08B 13/19623 348/152 |
| 2009/0315712 A1* | 12/2009 | Bloemendaal | G08B 13/19602 340/541 |
| 2009/0322874 A1* | 12/2009 | Knutson | G08B 13/196 348/143 |
| 2009/0322882 A1 | 12/2009 | Seo et al. | |
| 2010/0026802 A1 | 2/2010 | Titus et al. | |
| 2010/0033568 A1* | 2/2010 | Lee | H04N 7/183 348/143 |
| 2010/0103020 A1* | 4/2010 | Wu | G01S 13/886 342/28 |
| 2010/0150456 A1 | 6/2010 | Tanaka | |
| 2010/0193668 A1* | 8/2010 | Kawabata | G01S 7/497 250/214 SW |
| 2010/0198365 A1* | 8/2010 | Kawabata | G01S 7/4817 700/12 |
| 2010/0208064 A1* | 8/2010 | Liu | G08B 13/19667 348/143 |
| 2010/0225455 A1 | 9/2010 | Claiborne et al. | |
| 2010/0238030 A1* | 9/2010 | Shafer | G08B 13/193 340/552 |
| 2010/0321183 A1 | 12/2010 | Donovan et al. | |
| 2011/0043806 A1 | 2/2011 | Guetta et al. | |
| 2011/0058036 A1 | 3/2011 | Metzger et al. | |
| 2011/0102588 A1 | 5/2011 | Trundle et al. | |
| 2011/0128150 A1* | 6/2011 | Kanga | H04N 7/188 340/541 |
| 2011/0169950 A1 | 7/2011 | Weaver | |
| 2012/0000431 A1* | 1/2012 | Khoshkish | A01K 15/023 119/720 |
| 2012/0140068 A1* | 6/2012 | Monroe | H04N 7/183 348/143 |
| 2012/0169842 A1 | 7/2012 | Chuang et al. | |
| 2012/0170902 A1* | 7/2012 | Zhu | G06F 16/7837 386/223 |
| 2012/0314063 A1 | 12/2012 | Cirker | |
| 2013/0057695 A1 | 3/2013 | Huisking | |
| 2013/0083198 A1* | 4/2013 | Maslan | H04N 7/188 348/155 |
| 2013/0169842 A1* | 7/2013 | Kojima | H04N 5/225 348/231.99 |
| 2014/0020635 A1* | 1/2014 | Sayers | A01K 15/02 119/721 |
| 2014/0029855 A1 | 1/2014 | Manako et al. | |
| 2014/0035775 A1* | 2/2014 | Zeng | G01S 13/931 342/52 |
| 2014/0085480 A1 | 3/2014 | Saptharishi | |
| 2014/0160294 A1* | 6/2014 | Naylor | G08B 13/19606 348/155 |
| 2014/0267716 A1 | 9/2014 | Child et al. | |
| 2015/0035987 A1 | 2/2015 | Fernandez | |
| 2015/0077566 A1* | 3/2015 | Xiao | H04N 7/188 348/152 |
| 2015/0163463 A1 | 6/2015 | Hwang et al. | |
| 2015/0301167 A1* | 10/2015 | Sentelle | G01S 13/888 342/22 |
| 2015/0310606 A1 | 10/2015 | Shreve et al. | |
| 2015/0325092 A1 | 11/2015 | Zhevelev | |
| 2016/0005281 A1 | 1/2016 | Laska et al. | |
| 2016/0026890 A1* | 1/2016 | Gupta | G06T 7/20 382/103 |
| 2016/0042621 A1* | 2/2016 | Hogg | G08B 13/19615 348/155 |
| 2016/0044287 A1* | 2/2016 | Scalisi | G08B 13/19684 348/159 |
| 2016/0091607 A1* | 3/2016 | Buckley | G01S 17/04 250/353 |
| 2016/0134918 A1 | 5/2016 | Chen et al. | |
| 2016/0147774 A1* | 5/2016 | Xiao-Devins | G06F 16/438 707/722 |
| 2016/0191864 A1* | 6/2016 | Siminoff | H04N 7/186 348/155 |
| 2016/0202678 A1* | 7/2016 | Aggarwal | G08B 13/19604 700/275 |
| 2016/0225160 A1* | 8/2016 | Shimada | G01B 11/14 |
| 2016/0295198 A1* | 10/2016 | Grossman | G08B 13/19608 |
| 2016/0342845 A1* | 11/2016 | Tien-Spalding | G08B 13/19656 |
| 2016/0358436 A1 | 12/2016 | Wautier et al. | |
| 2016/0366346 A1* | 12/2016 | Shin | H04N 5/33 |
| 2016/0374177 A1* | 12/2016 | Chen | G06F 3/04883 |
| 2017/0048495 A1* | 2/2017 | Scalisi | G08B 3/10 |
| 2017/0076588 A1* | 3/2017 | Naylor | G08B 29/185 |
| 2017/0084252 A1* | 3/2017 | Matsuo | G06T 3/40 |
| 2017/0084452 A1 | 3/2017 | Yang et al. | |
| 2017/0147885 A1* | 5/2017 | Aggarwal | G08B 13/194 |
| 2017/0181249 A1 | 6/2017 | Takahashi | |
| 2017/0193782 A1* | 7/2017 | Purohit | G06K 9/00771 |
| 2017/0201724 A1 | 7/2017 | Galvin et al. | |
| 2017/0243472 A1* | 8/2017 | Davies | G08B 13/1963 |
| 2017/0358186 A1* | 12/2017 | Harpole | G08B 13/19682 |
| 2018/0012463 A1* | 1/2018 | Chaudhry | G06K 9/00771 |
| 2018/0018081 A1* | 1/2018 | Dattilo-Green | H04L 67/025 |

(56) References Cited

U.S. PATENT DOCUMENTS

| | | |
|---|---|---|
| 2018/0033271 A1 | 2/2018 | Xia et al. |
| 2018/0075593 A1* | 3/2018 | Wang .................... G06T 7/85 |
| 2018/0102858 A1* | 4/2018 | Tiwari ................... H04L 67/18 |
| 2018/0113577 A1 | 4/2018 | Burns et al. |
| 2018/0114421 A1* | 4/2018 | Siminoff ............... H04N 7/186 |
| 2018/0174413 A1 | 6/2018 | Siminoff |
| 2018/0176512 A1 | 6/2018 | Siminoff |
| 2018/0249054 A1* | 8/2018 | Chien .................. H04N 5/2257 |
| 2019/0080573 A1* | 3/2019 | Mieko ................... G01J 5/0806 |
| 2019/0212432 A1* | 7/2019 | DiPoala ................. G01P 13/00 |

FOREIGN PATENT DOCUMENTS

| | | | |
|---|---|---|---|
| CA | 2861370 A1 * | 3/2015 | .............. H04N 5/33 |
| CN | 2585521 Y | 11/2003 | |
| CN | 2792061 Y | 6/2006 | |
| EP | 0944883 A1 | 6/1998 | |
| EP | 0853237 A1 * | 7/1998 | ........... G08B 13/191 |
| EP | 1376502 | 1/2004 | |
| EP | 1480462 A1 | 11/2004 | |
| EP | 2645345 A1 * | 10/2013 | ....... G08B 13/19695 |
| GB | 2286283 A | 8/1995 | |
| GB | 2354394 A | 3/2001 | |
| GB | 2357387 A | 6/2001 | |
| GB | 2391936 A * | 2/2004 | ........... G08B 13/193 |
| GB | 2400958 A | 10/2004 | |
| GB | 2431987 A * | 5/2007 | ........... G08B 13/193 |
| JP | 2001-103463 A | 4/2001 | |
| JP | 2002-033839 A | 1/2002 | |
| JP | 2002-125059 A | 4/2002 | |
| JP | 2002-342863 A | 11/2002 | |
| JP | 2002-344640 A | 11/2002 | |
| JP | 2002-354137 A | 12/2002 | |
| JP | 2002-368890 A | 12/2002 | |
| JP | 2003-283696 A | 10/2003 | |
| JP | 2004-128835 A | 4/2004 | |
| JP | 2004171279 A * | 6/2004 | |
| JP | 2005-341040 A | 12/2005 | |
| JP | 2006018750 A * | 1/2006 | ............. G08B 13/19 |
| JP | 2006-147650 A | 6/2006 | |
| JP | 2006-262342 A | 9/2006 | |
| JP | 2009-008925 A | 1/2009 | |
| KR | 10-2016-0032561 A | 3/2016 | |
| WO | 1998/39894 A1 | 9/1998 | |
| WO | 2001/13638 A1 | 2/2001 | |
| WO | 2001/93220 A1 | 12/2001 | |
| WO | WO0245434 | 6/2002 | |
| WO | 2002/085019 A1 | 10/2002 | |
| WO | 2003/028375 A1 | 4/2003 | |
| WO | WO2003028375 | 4/2003 | |
| WO | 2003/096696 A1 | 11/2003 | |
| WO | WO2003096696 | 11/2003 | |
| WO | 2006/038760 A1 | 4/2006 | |
| WO | 2006/067782 A1 | 6/2006 | |
| WO | 2007/125143 A1 | 8/2007 | |
| WO | WO-2007108790 A1 * | 9/2007 | ........... G08B 13/193 |

OTHER PUBLICATIONS

OA for U.S. Appl. No. 15/897,792, dated Apr. 1, 2020, Siminoff, "Customizable Intrusion Zones Associated With Security Systems", 10 Pages.

Office Action for U.S. Appl. No. 15/897,887, dated Apr. 30, 2020, Siminoff, "Customizable Intrusion Zones Associated With Security Systems", 17 Pages.

Non Final Office Action dated Sep. 19, 2019 for U.S. Appl. No. 15/897,792 "Customizable Intrusion Zones Associated With Security Systems" Siminoff, 15 pages.

Non Final Office Action dated Oct. 2, 2019 for U.S. Appl. No. 15/897,887 "Customizable Intrusion Zones Associated With Security Systems" Siminoff, 15 pages.

Office Action for U.S. Appl. No. 15/897,792, dated Sep. 3, 2020, Siminoff, "Customizable Intrusion Zones Associated With Security Systems", 9 Pages.

Office Action for U.S. Appl. No. 15/897,792, dated Mar. 17, 2021, Siminoff, "Customizable Intrusion Zones Associated With Security Systems", 13 Pages.

Office Action for U.S. Appl. No. 15/794,001, dated Apr. 29, 2021, Siminoff, "Customizable Intrusion Zones Associated With Security Systems", 22 pages.

Office Action for U.S. Appl. No. 15/897,792, dated Sep. 2, 2021, Siminoff, "Customizable Intrusion Zones Associated With Security Systems", 16 pages.

* cited by examiner

CUSTOMIZABLE INTRUSION ZONES FOR AUDIO/VIDEO RECORDING AND COMMUNICATION DEVICES

CROSS-REFERENCE TO RELATED APPLICATION

This application claims priority to provisional application Ser. No. 62/413,378, filed on Oct. 26, 2016, the entire contents of which are hereby incorporated by reference.

TECHNICAL FIELD

The present embodiments relate to audio/video (A/V) recording and communication devices, including A/V recording and communication doorbell systems. In particular, the present embodiments relate to improvements in the functionality of A/V recording and communication devices that enable customization of intrusion zones, thereby strengthening the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present customizable intrusion zones for audio/video (A/V) recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that sometimes motion detected by an A/V recording and communication device may be indicative of a threat, such as an intruder, and other times the motion may be benign, such as motion caused by an invited visitor, a parcel delivery carrier, a neighbor, an animal, or a passing vehicle. It would be advantageous, therefore, if the functionality of A/V recording and communication devices could be enhanced in one or more ways to distinguish between various types of motion within the field of view of the A/V recording and communication device. Such enhancements could increase the effectiveness of A/V recording and communication devices by providing a warning to the user when it is likely that detected motion is associated with a threat, while also possibly suppressing warnings to the user when it is unlikely that detected motion is associated with a threat. The user would thus be less likely to suffer alert fatigue due to persistent false alarms, thereby making it more likely that the user will respond to warnings that are associated with actual threats. The present embodiments provide these advantages and enhancements, as described below.

In a first aspect, a method for an audio/video (A/V) recording and communication device is provided, the method comprising on a computing device with a display, displaying, on the display of the computing device, a user interface for creating and/or customizing at least one intrusion zone of the A/V recording and communication device, wherein the at least one intrusion zone comprises at least one motion zone within a field of view of the A/V recording and communication device coupled with at least one conditional setting of the at least one motion zone, determining whether an input has been received to establish a new conditional setting of the at least one conditional setting of the at least one intrusion zone, or to change a previous conditional setting of the at least one conditional setting of the at least one intrusion zone, when an input has been received to establish the new conditional setting of the at least one intrusion zone or to change the previous conditional setting of the at least one intrusion zone, then determining whether an input has been received to save the new conditional setting of the at least one intrusion zone or to save the changed conditional setting of the at least one intrusion zone, and when an input has been received to save the new conditional setting of the at least one intrusion zone or to save the changed conditional setting for the at least one intrusion zone, then saving the new conditional setting or the changed conditional setting.

In an embodiment of the first aspect, the at least one conditional setting of the at least one motion zone comprises a time of day, a level of ambient light, a location of motion detection, a direction of movement, a speed of movement, a length of time that an object is within the at least one motion zone, a level of reflecting light intensity, and/or a body posture of a person within the at least one motion zone.

In another embodiment of the first aspect, the at least one intrusion zone further comprises an action to be taken when motion is detected in the at least one motion zone and the at least one conditional setting of the at least one intrusion zone is satisfied.

In another embodiment of the first aspect, the action comprises transmitting an intrusion alert to a client device.

In another embodiment of the first aspect, the intrusion alert is transmitted to the client device even when motion alerts are inactive for the at least one motion zone where the motion was detected.

In another embodiment of the first aspect, the intrusion alert includes a notification about a type of the alert.

In another embodiment of the first aspect, the notification comprises an indication of the at least one motion zone where the motion was detected.

In another embodiment of the first aspect, the action comprises activating a lighting device.

In another embodiment of the first aspect, the action comprises transmitting an intrusion alert signal to a server for providing a warning message about the detected motion to at least one social network.

In another embodiment of the first aspect, the action comprises sending an intrusion alert to a first set of client devices, wherein the first set of client devices differs from a second set of client devices that is designated to receive an alert when motion is detected in the at least one motion zone but the at least one conditional setting of the at least one intrusion zone is not satisfied.

In another embodiment of the first aspect, the action comprises activating an intruder intervention module configured to intervene with a person that caused the detected motion.

In another embodiment of the first aspect, an intervention with the person that caused the detected motion comprises emitting a warning sound through a speaker of the A/V recording and communication device and/or emitting a verbal warning message through the speaker of the A/V recording and communication device.

In another embodiment of the first aspect, the user interface comprises a diagram of the field of view of the A/V recording and communication device, the diagram indicating the at least one motion zone within the field of view.

In another embodiment of the first aspect, the diagram indicates a plurality of motion zones within the field of view, each of the plurality of motion zones being delineated by boundary lines.

Another embodiment of the first aspect further comprises receiving a selection of the at least one intrusion zone, the at least one intrusion zone corresponding to at least one of the plurality of motion zones.

In another embodiment of the first aspect, each of the plurality of motion zones is enumerated with a unique zone number.

In another embodiment of the first aspect, the diagram includes an ON/OFF indicator for each of the plurality of motion zones.

In another embodiment of the first aspect, the diagram is a top view.

In another embodiment of the first aspect, saving the new conditional setting or the changed conditional setting for the at least one intrusion zone comprises transmitting a setting save signal to a server.

In another embodiment of the first aspect, the A/V recording and communication device includes a plurality of motion sensors.

In a second aspect, a method for an audio/video (A/V) recording and communication device is provided, the A/V recording and communication device having a field of view including at least one intrusion zone, the at least one intrusion zone comprising at least one motion zone within a field of view of the A/V recording and communication device coupled with at least one conditional setting of the at least one motion zone, the method comprising detecting motion in the at least one intrusion zone of the A/V recording and communication device, determining whether the at least one conditional setting of the at least one intrusion zone is satisfied, when the at least one conditional setting of the at least one intrusion zone is satisfied, then determining at least one action to be taken in response to the detected motion in the at least one intrusion zone of the A/V recording and communication device, and executing the determined at least one action.

In an embodiment of the second aspect, the at least one intrusion zone setting comprises a time of day, a level of ambient light, a location of motion detection, a direction of movement, a speed of movement, a length of time that an object is within the at least one motion zone, a level of reflecting light intensity, and/or a body posture of a person within the at least one motion zone.

In another embodiment of the second aspect, the at least one action comprises sending an intrusion alert to a client device.

In another embodiment of the second aspect, the intrusion alert includes a notification about a type of the alert.

In another embodiment of the second aspect, the notification comprises an indication of the at least one motion zone where the motion was detected.

In another embodiment of the second aspect, the intrusion alert is sent to the client device even when motion alerts are inactive for the at least one motion zone where the motion was detected.

In another embodiment of the second aspect, the at least one action comprises activating a lighting device.

In another embodiment of the second aspect, the at least one action comprises transmitting an intrusion alert signal to a server for providing a warning message about the detected motion to at least one social network.

In another embodiment of the second aspect, the at least one action comprises sending an intrusion alert to a first set of client devices, wherein the first set of client devices differs from a second set of client devices that is designated to receive an alert when motion is detected in the at least one motion zone but the at least one conditional setting of the at least one intrusion zone is not satisfied.

In another embodiment of the second aspect, the at least one action comprises activating an intruder intervention module configured to intervene with a person that caused the detected motion.

In another embodiment of the second aspect, an intervention with the person that caused the detected motion comprises emitting a warning sound through a speaker of the A/V recording and communication device and/or emitting a verbal warning message through the speaker of the A/V recording and communication device.

BRIEF DESCRIPTION OF THE DRAWINGS

The various embodiments of the present customizable intrusion zones for audio/video (A/V) recording and communication devices now will be discussed in detail with an emphasis on highlighting the advantageous features. These embodiments depict the novel and non-obvious customizable intrusion zones for audio/video (A/V) recording and communication devices shown in the accompanying drawings, which are for illustrative purposes only. These drawings include the following figures, in which like numerals indicate like parts.

DETAILED DESCRIPTION

Figure 1:
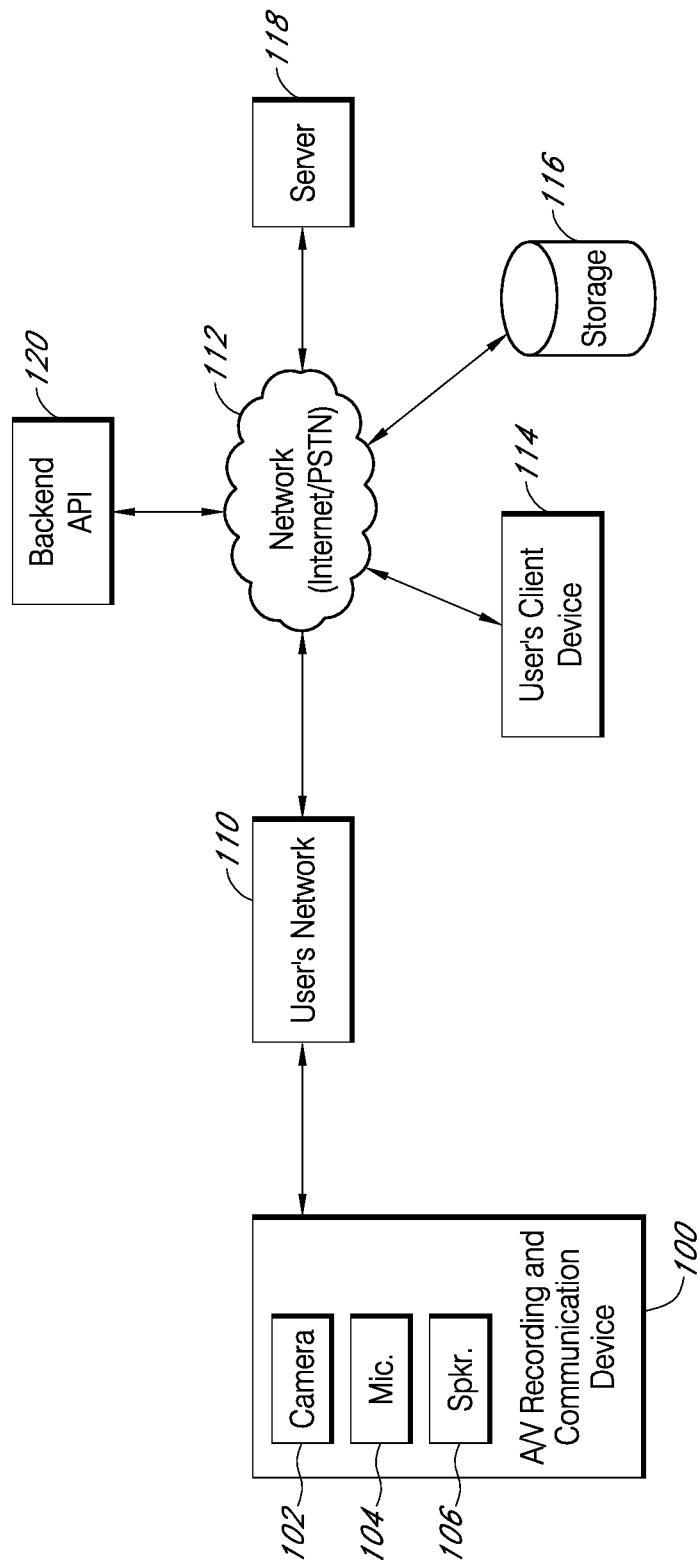
FIG. 1 is a functional block diagram illustrating a system for streaming and storing A/V content captured by an audio/video (A/V) recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

The embodiments of the present customizable intrusion zones for audio/video (A/V) recording and communication devices are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) recording and communication device 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image-display resolution of 720p or better. While not shown, the A/V recording and communication device 100 may also include other hardware and/or components, such as a housing, a communication module (which may facilitate wired and/or wireless communication with other devices), one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the home network 110 and the network 112 (Internet/PSTN). The user's client device 114 may comprise, for example, a mobile telephone (may also be referred to as a cellular telephone), such as a smartphone, a personal digital assistant (PDA), or another communication and/or computing device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the home network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE, Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell).

In response to the detection of the visitor, the A/V recording and communication device 100 sends an alert to the user's client device 114 (FIG. 1) via the user's home network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
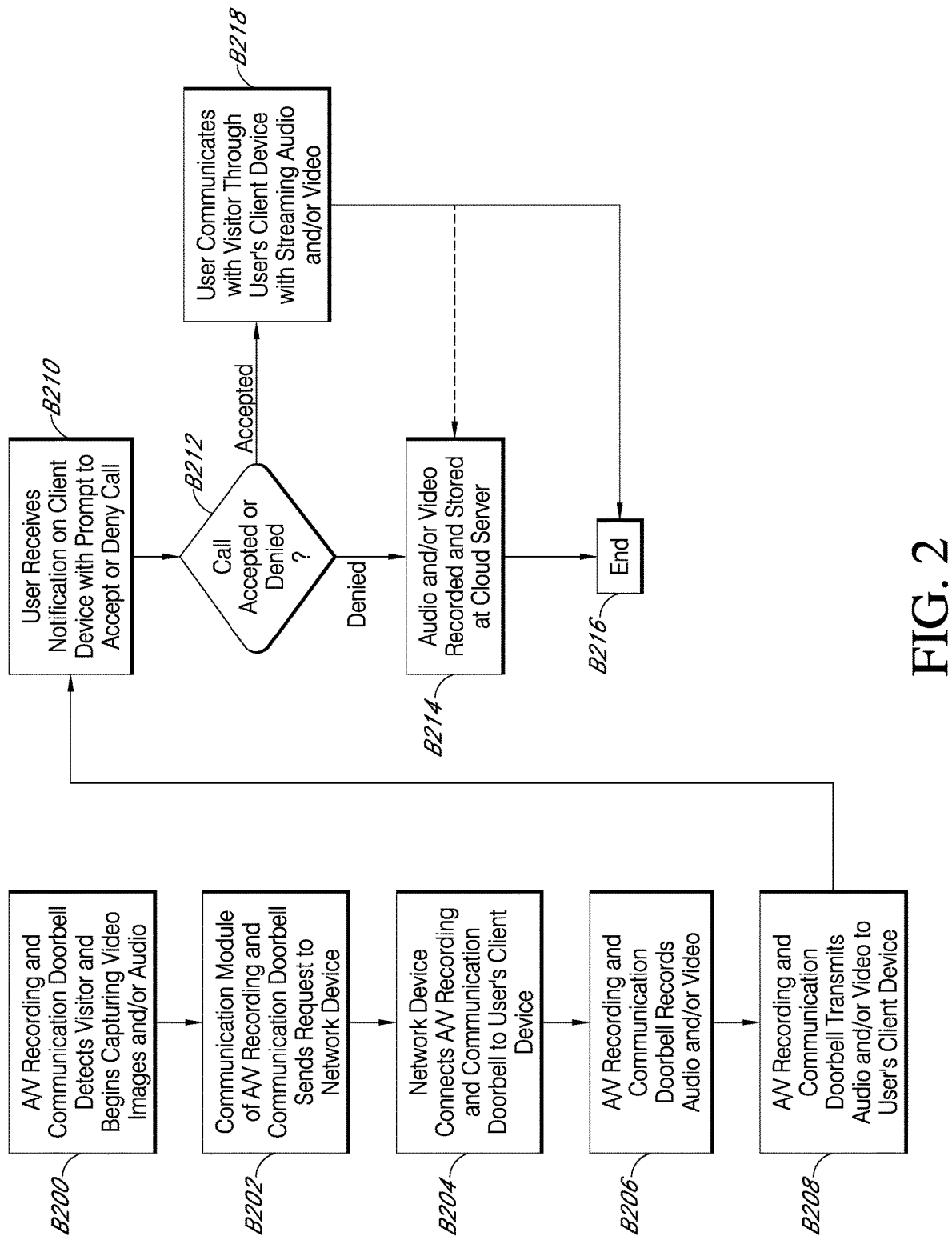
FIG. 2 is a flowchart illustrating a process for streaming and storing A/V content from an A/V recording and communication device according to various aspects of the present disclosure.

FIG. 2 is a flowchart illustrating a process for streaming and storing A/V content from the A/V recording and communication device 100 according to various aspects of the present disclosure. At block B200, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B202, a communication module of the A/V recording and communication device 100 sends a request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other device/sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 3:
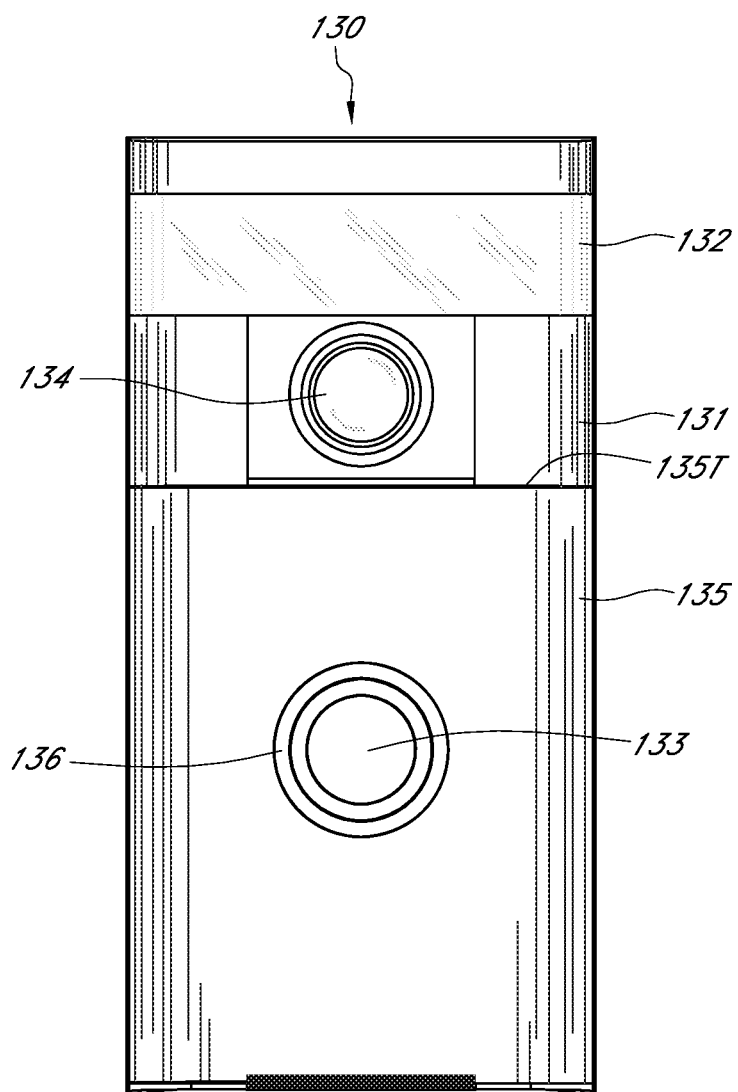
FIG. 3 is a front view of an A/V recording and communication device according to various aspects of the present disclosure.
Figure 4:
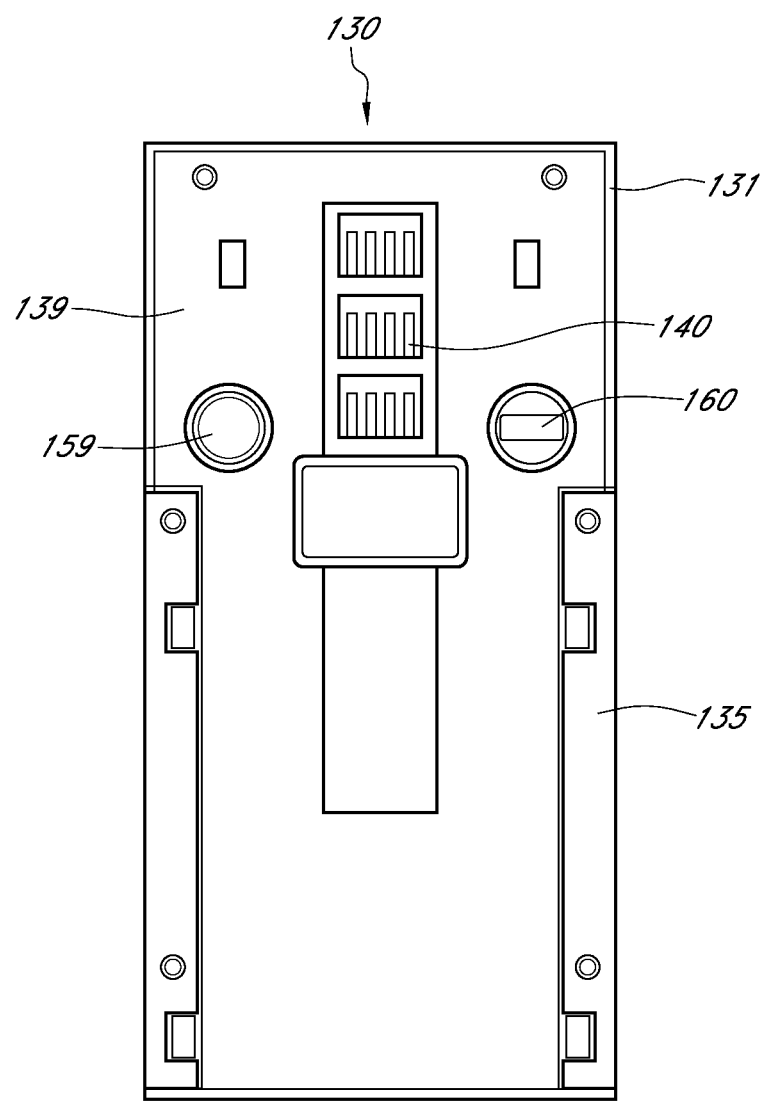
FIG. 4 is a rear view of the A/V recording and communication device of FIG. 3.
Figure 5:
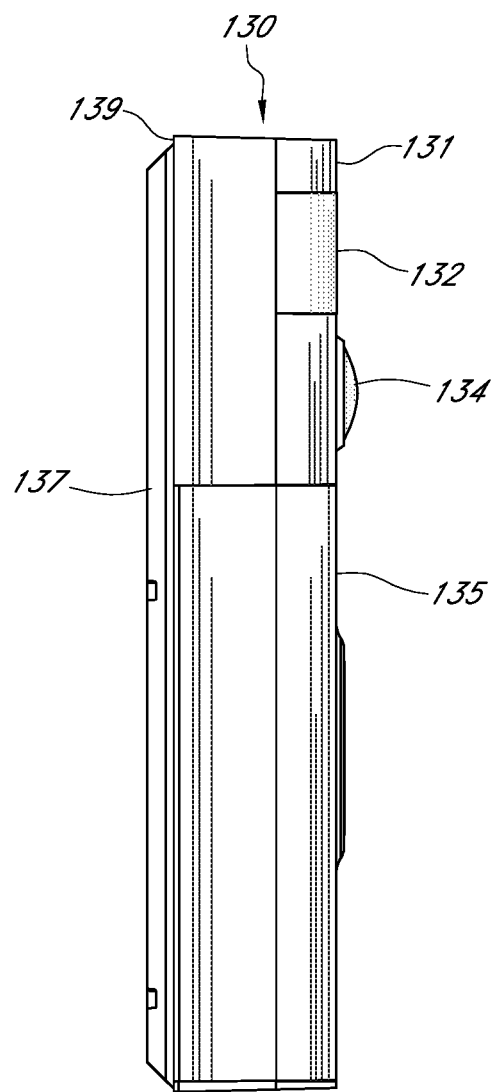
FIG. 5 is a left side view of the A/V recording and communication device of FIG. 3 attached to a mounting bracket according to various aspects of the present disclosure.

FIGS. 3-5 illustrate an audio/video (A/V) recording and communication doorbell 130 according to an aspect of the present embodiments. The A/V recording and communication doorbell 130 may be used in any of the processes described herein. FIG. 3 is a front view, FIG. 4 is a rear view, and FIG. 5 is a left side view of the doorbell 130 coupled with a mounting bracket 137. The doorbell 130 includes a faceplate 135 mounted to a back plate 139 (FIG. 4). With reference to FIG. 5, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 3, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 3 and 5, the doorbell 130 further includes an enclosure 131 that engages the faceplate 135. In the illustrated embodiment, the enclosure 131 abuts an upper edge 135T (FIG. 3) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 4 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 4, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 5 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 5, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 6:
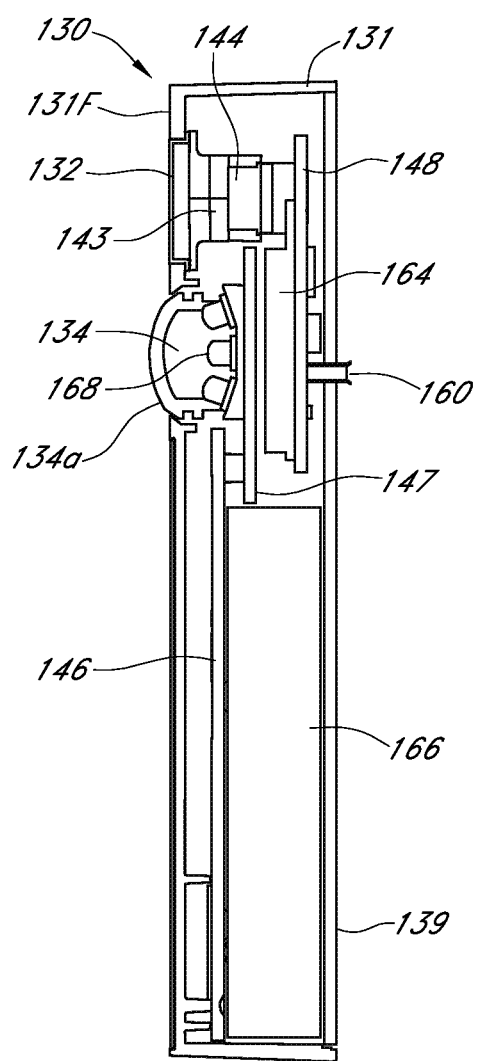
FIG. 6 is cross-sectional right side view of the A/V recording and communication device of FIG. 3.

FIG. 6 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 6, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160.

With continued reference to FIG. 6, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 6, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. In some embodiments, the doorbell 130 may comprise three PIR sensors 144, as further described below, but in other embodiments any number of PIR sensors 144 may be provided. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 7:
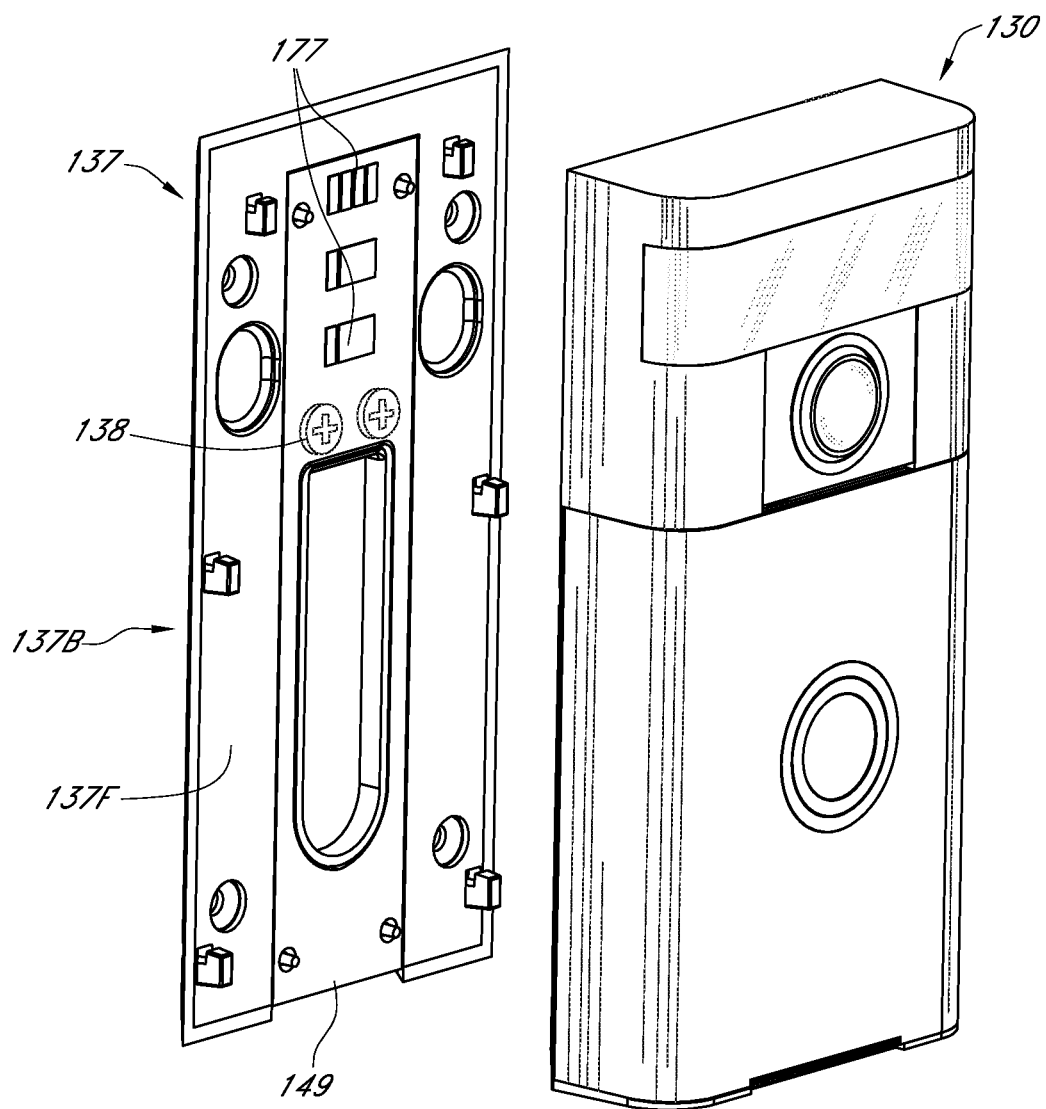
FIG. 7 is an exploded view of the A/V recording and communication device and the mounting bracket of FIG. 5.

FIG. 7 is an exploded view of the doorbell 130 and the mounting bracket 137 according to an aspect of the present embodiments. The mounting bracket 137 is configured to be mounted to a mounting surface (not shown) of a structure, such as a home or an office. FIG. 7 shows the front side 137F of the mounting bracket 137. The mounting bracket 137 is configured to be mounted to the mounting surface such that the back side 137B thereof faces the mounting surface. In certain embodiments the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 7, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 8:
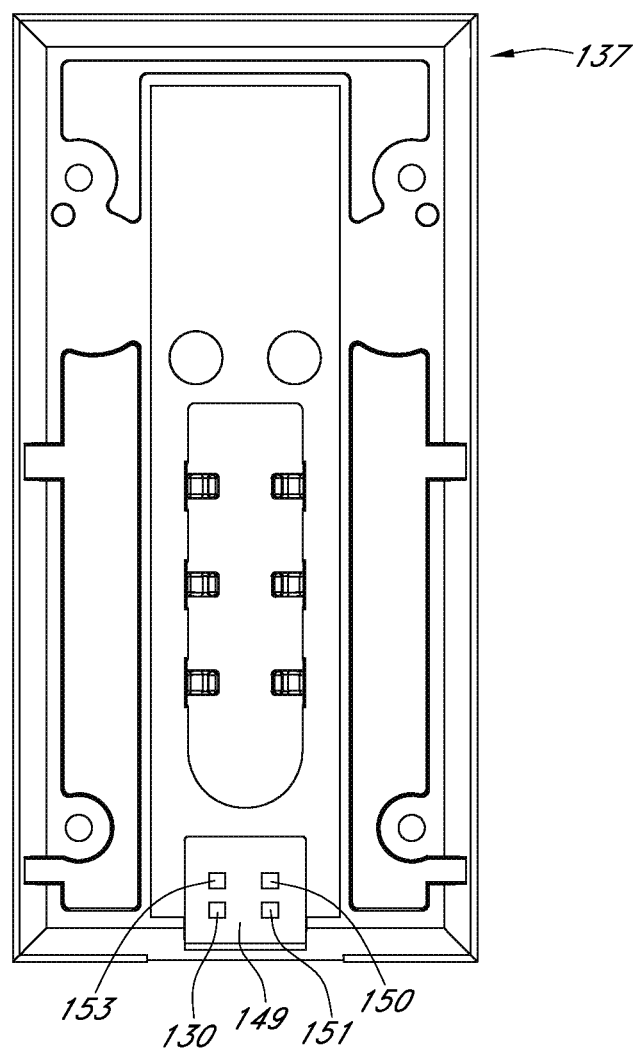
FIG. 8 is a rear view of the mounting bracket of FIG. 5.

With reference to FIGS. 7 and 8 (which is a rear view of the mounting bracket 137), the mounting bracket 137 further comprises a bracket PCB 149. With reference to FIG. 8, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 9:
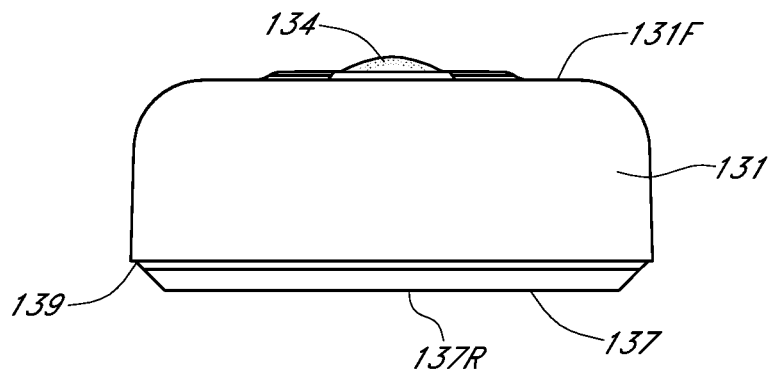
FIGS. 9 and 10 are top and bottom views, respectively, of the A/V recording and communication device and the mounting bracket of FIG. 5.
Figure 10:
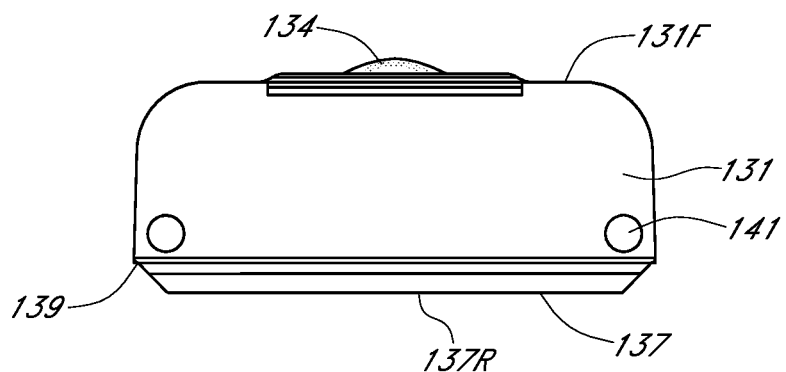

FIGS. 9 and 10 are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 10, the lower end of the enclosure 131 may include security screw apertures 141 configured to receive screws or other fasteners.

Figure 11:
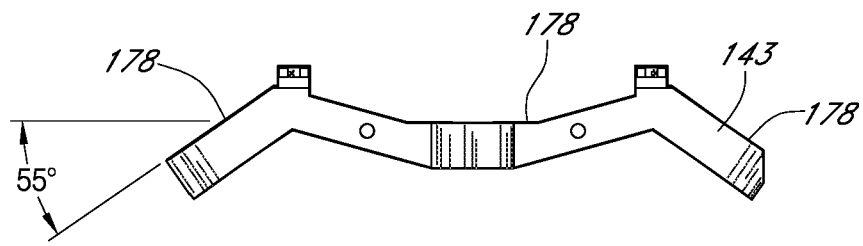
FIGS. 11 and 12 are top and front views, respectively, of a passive infrared sensor holder of the A/V recording and communication device of FIG. 3.

FIG. 11 is a top view of the PIR sensor holder 143. The PIR sensor holder 143 may comprise any suitable material, including, without limitation, metals, metal alloys, or plastics. The PIR sensor holder 143 is configured to mount the PIR sensors 144 behind the lens 132 such that the PIR sensors 144 face out through the lens 132 at varying angles, thereby creating a wide field of view for the PIR sensors 144, and dividing the field of view into zones, as further described below. With further reference to FIG. 11, the PIR sensor holder 143 includes one or more faces 178 within or on which the PIR sensors 144 may be mounted. In the illustrated embodiment, the PIR sensor holder 143 includes three faces 178, with each of two outer faces 178 angled at 55° with respect to a center one of the faces 178. In alternative embodiments, the angle formed by adjacent ones of the faces 178 may be increased or decreased as desired to alter the field of view of the PIR sensors 144.

Figure 12:
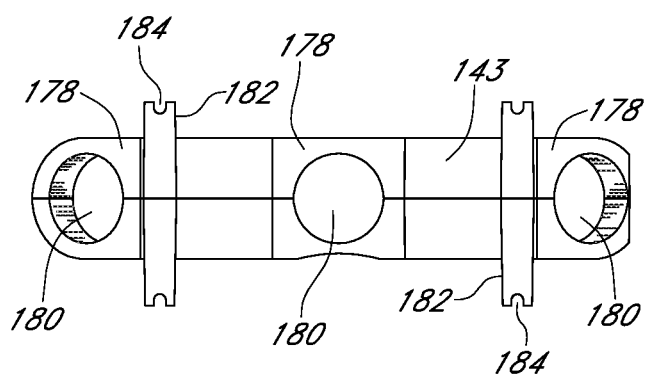

FIG. 12 is a front view of the PIR sensor holder 143. In the illustrated embodiment, each of the faces 178 includes a through hole 180 in which the PIR sensors 144 may be mounted. First and second brackets 182, spaced from one another, extend transversely across the PIR sensor holder 143. Each of the brackets 182 includes notches 184 at either end. The brackets 182 may be used to secure the PIR sensor holder 143 within the doorbell 130. In alternative embodiments, the through holes 180 in the faces 178 may be omitted. For example, the PIR sensors 144 may be mounted directly to the faces 178 without the through holes 180. Generally, the faces 178 may comprise any structure configured to locate and secure the PIR sensors 144 in place.

Figure 13:
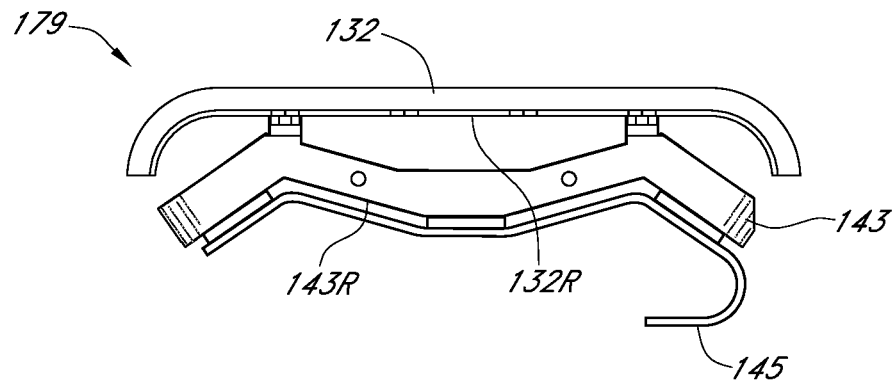
FIGS. 13 and 14 are top and front views, respectively, of a passive infrared sensor holder assembly of the A/V recording and communication device of FIG. 3.
Figure 14:
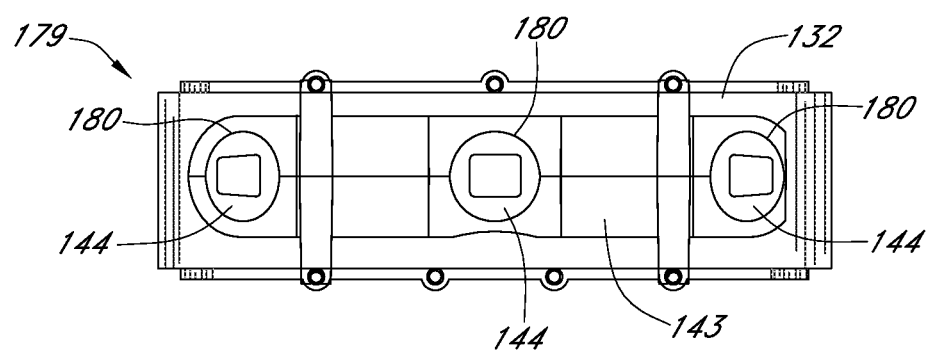

FIGS. 13 and 14 are top and front views, respectively, of a PIR sensor assembly 179, including the PIR sensor holder 143, the lens 132, and a flexible power circuit 145. The PIR sensor holder 143 may be secured to a rear face 132R of the lens 132, as shown, with the brackets 182 abutting the rear face 132R of the lens 132. The flexible power circuit 145, which may be any material or component capable of delivering power and/or data to and from the PIR sensors 144, is secured to a rear face 143R of the PIR sensor holder 143, and may be contoured to match the angular shape of the PIR sensor holder 143. The flexible power circuit 145 may connect to, draw power from, and/or transmit data to and/or from, the power PCB 148 (FIG. 6).

Figure 15:
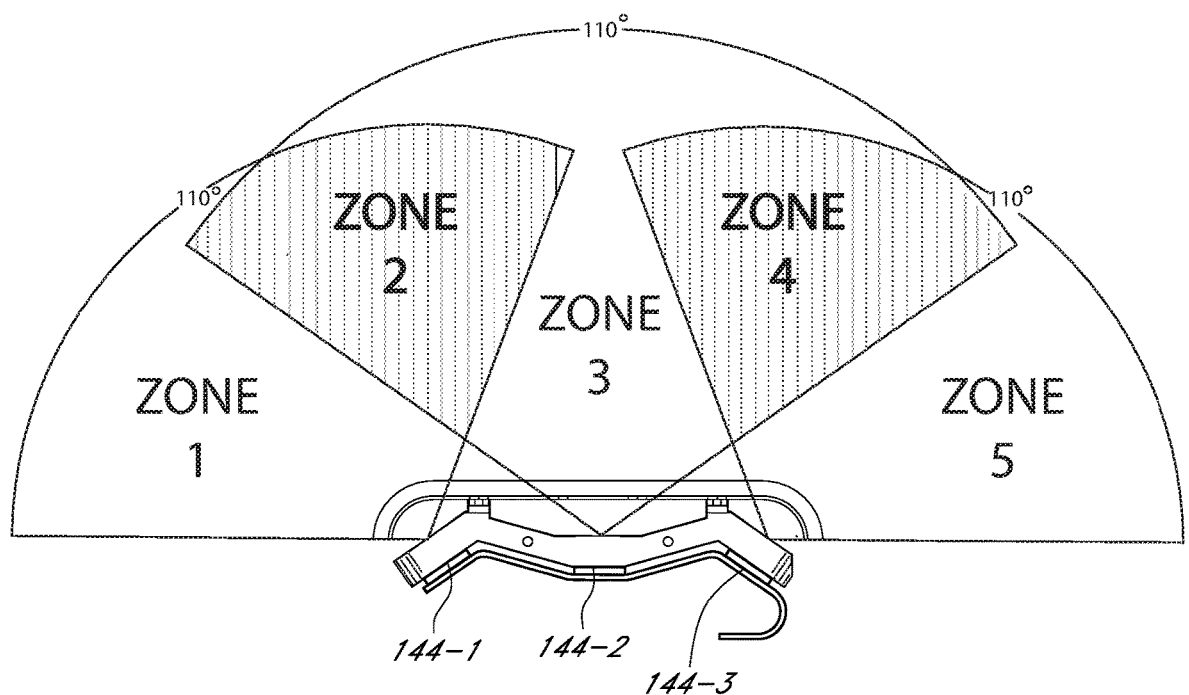
FIG. 15 is a top view of the passive infrared sensor assembly of FIG. 11 and a field of view thereof according to an aspect of the present disclosure.

FIG. 15 is a top view of the PIR sensor assembly 179 illustrating the fields of view of the PIR sensors 144. Each PIR sensor 144 includes a field of view, referred to as a "zone," that traces an angle extending outward from the respective PIR sensor 144. Zone 1 is the area that is visible only to passive infrared sensor 144-1. Zone 2 is the area that is visible only to the PIR sensors 144-1 and 144-2. Zone 3 is the area that is visible only to passive infrared sensor 144-2. Zone 4 is the area that is visible only to the PIR sensors 144-2 and 144-3. Zone 5 is the area that is visible only to passive infrared sensor 144-3. The doorbell 130 may be capable of determining the direction that an object is moving based upon which zones are triggered in a time sequence. In the illustrated embodiment, each zone extends across an angle of 110°. In alternative embodiments, each zone may extend across a different angle, such as one greater than or less than 110°.

Figure 16:
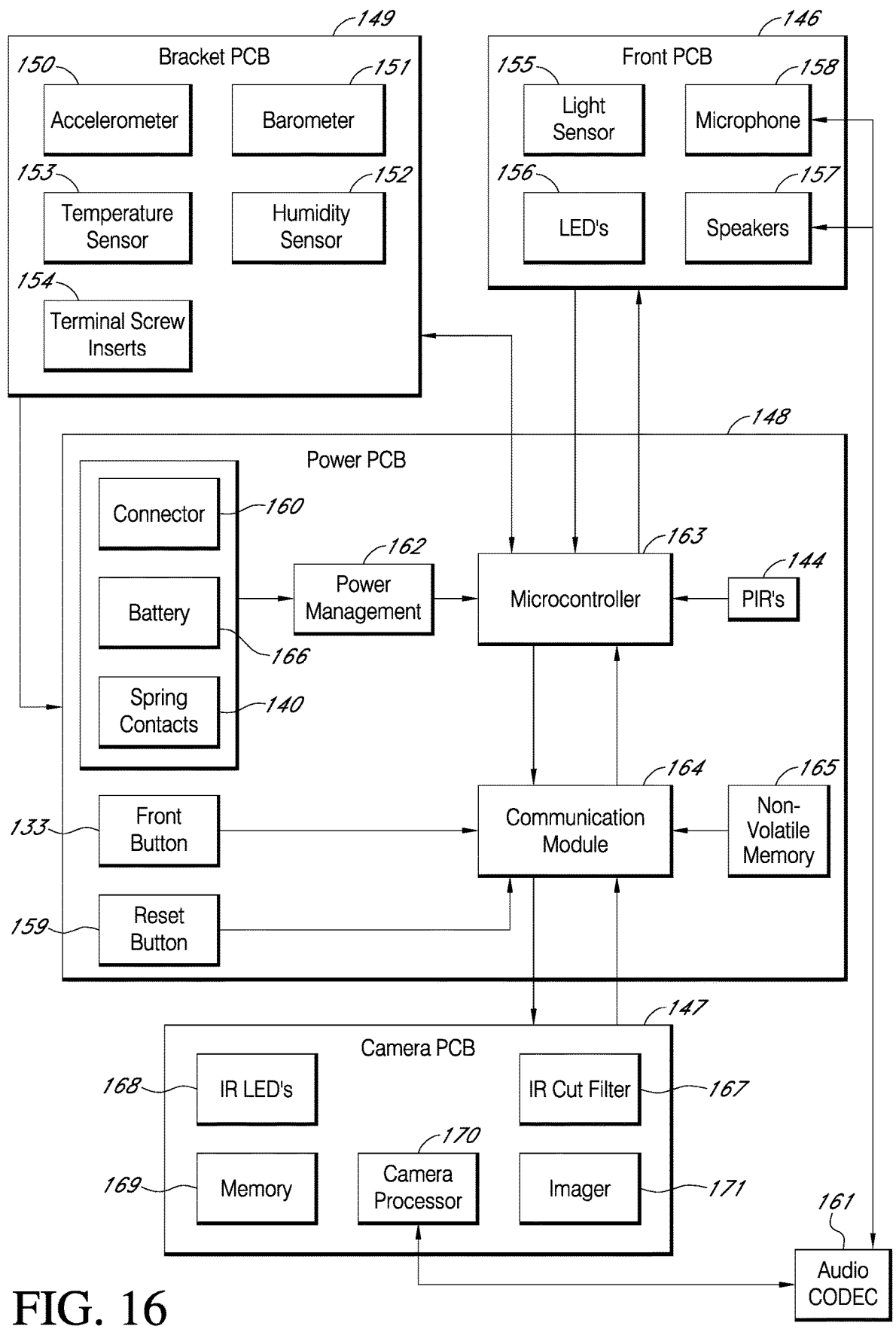
FIG. 16 a functional block diagram of the components of the A/V recording and communication device of FIG. 3.

FIG. 16 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 16, the bracket PCB 149 may further comprise terminal screw inserts 154, which may be configured to receive the terminal screws 138 and transmit power to the electrical contacts 177 on the mounting bracket 137 (FIG. 7). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 16, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electromechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 3). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 16, the power PCB 148 may comprise a power management module 162, a microcontroller 163 (may also be referred to as "processor," "CPU," or "controller"), the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. The power management module 162 may also serve as a conduit for data between the connector 160 and the microcontroller 163. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160.

With further reference to FIG. 16, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 16, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 16, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 720p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SDRAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 133, the button actuator, and/or the light pipe 136. An example A/V recording and communication security camera may further omit other components, such as, for example, the bracket PCB 149 and its components.

As described above, the present embodiments advantageously leverage the functionality of A/V recording and communication devices to selectively monitor one or more intrusion zones. For example, an A/V recording and communication device may be configured to detect motion within its field of view and determine whether at least one conditional setting is satisfied. In various embodiments, conditional settings may include (but are not limited to) a time of day, a level of ambient light, a direction of movement, a speed of movement, a length of time an object is within an intrusion zone, a level of reflecting light intensity, and/or a body posture of a person within an intrusion zone. In some embodiments, when motion is detected in the intrusion zone while the at least one conditional setting is satisfied, an intrusion action may be determined and executed. By selectively monitoring intrusions using conditional settings, A/V recording and communication device resources may be preserved, and unwarranted intrusion alerts may be avoided.

In certain embodiments according to the present disclosure, the user may remotely modify settings of an A/V recording and communication device, such as (but not limited to) the A/V recording and communication device 100 (FIG. 1) and/or the A/V recording and communication doorbell 130 (FIGS. 3-16). For example, the user may toggle one or more zones (areas of the fields of view of the passive infrared sensors 144, FIG. 15) ON and OFF. In another example, the user may increase and decrease the range (or sensitivity) of the passive infrared sensors 144. Changes to the settings of the A/V recording and communication doorbell 130 may affect the notifications that the user receives from the A/V recording and communication doorbell 130. For example, the user may turn off selected zones and/or decrease the range of the passive infrared sensors 144 to reduce "false alarm" alerts, such as those generated by passing cars.

Figure 17:
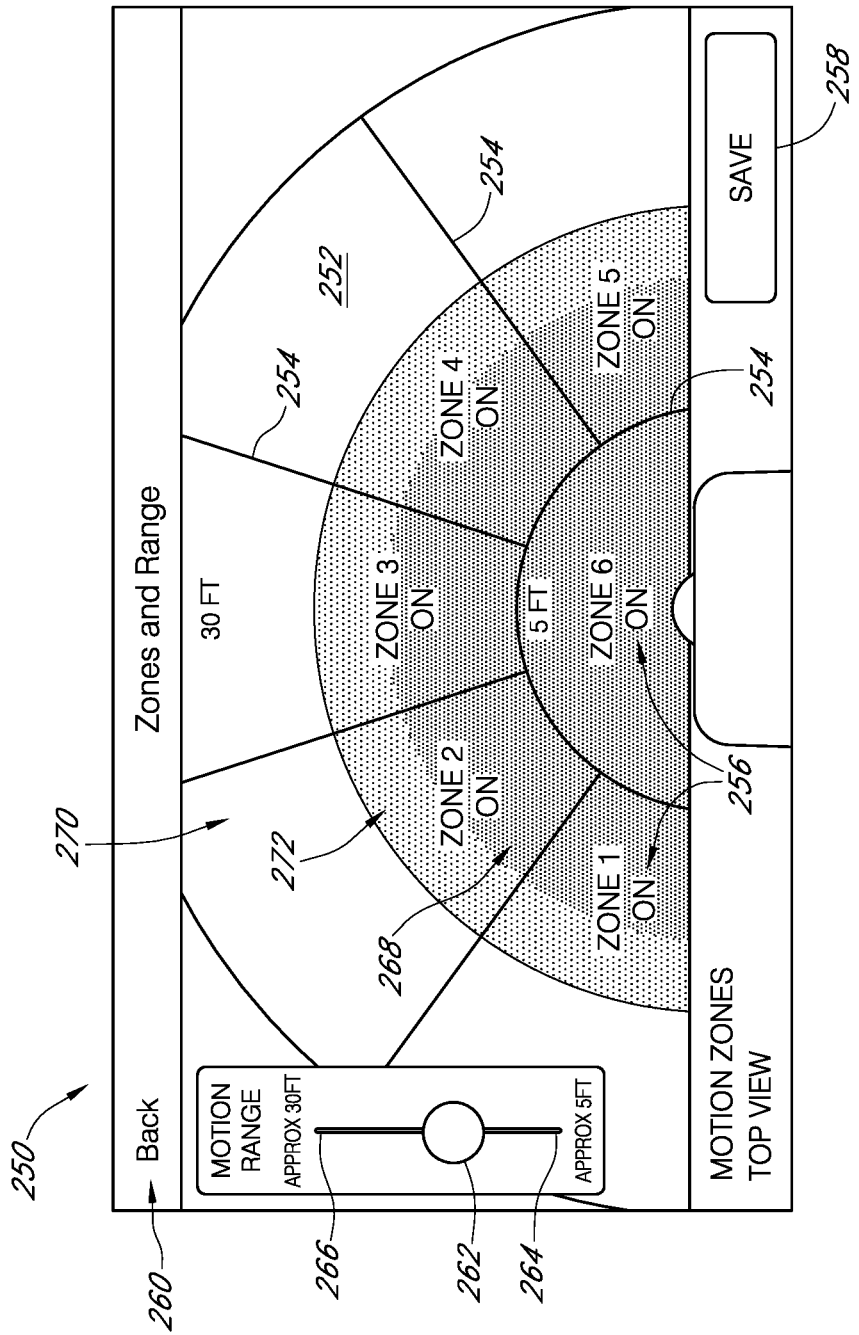
FIGS. 17-23 are screenshots of a graphical user interface for use in a technique for creating and/or customizing intrusion zones for an A/V recording and communication device according to various aspects of the present disclosure.

FIGS. 17-23 are screenshots of one example of a graphical user interface (GUI) 250 for modifying settings of the A/V recording and communication doorbell 130 according to an aspect of the present disclosure. In one example, the user may modify settings by selecting a menu choice from within a software application installed on the user's computer or mobile device. With reference to FIG. 17, upon selecting the menu choice for modifying settings of the A/V recording and communication doorbell 130, the software application may display, on a display of the user's computer or mobile device, a diagram 252 of the field of view about the A/V recording and communication doorbell 130. The diagram 252 may indicate the motion zones within the field of view, with each zone delineated by boundary lines 254 and enumerated with a unique zone identifier, such as a number (Zones 1-6). In the embodiment illustrated in FIG. 17, the zone diagram 252 is a top view, but in alternative embodiments the zone diagram 252 may be presented from a different perspective, such as a front view or a side view.

With further reference to FIG. 17, the zone diagram 252 further includes an ON/OFF indicator 256 for each zone. In the configuration of FIG. 17, Zones 1-6 are all ON. The user may toggle selected ones of the zones ON and OFF by individually selecting each zone. For example, if the display of the user's computer or mobile device is a touchscreen, the user may toggle a selected zone by touching that area of the touchscreen. In another example, the user may select zones to toggle ON/OFF by clicking on those zones in the GUI 250 using a pointing device such as a mouse or a trackball. If conditional settings, which are described below, are not used, then zones that are ON will trigger motion alerts when movement is detected in those zones, while no motion alerts will be triggered for any zones that are OFF. However, if conditional settings are used, zones that are ON will trigger motion alerts when movement is detected in those zones and at least one conditional setting is satisfied, as further discussed below.

Figure 18:
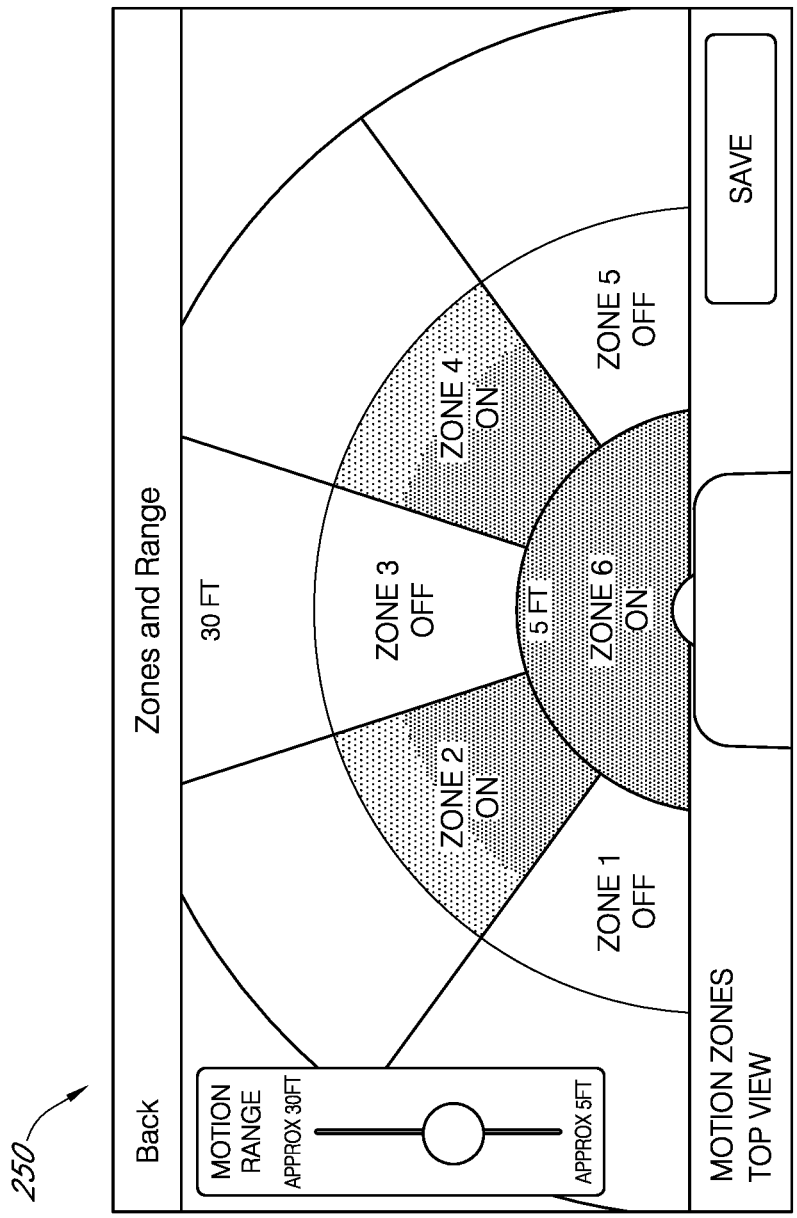
Figure 19:
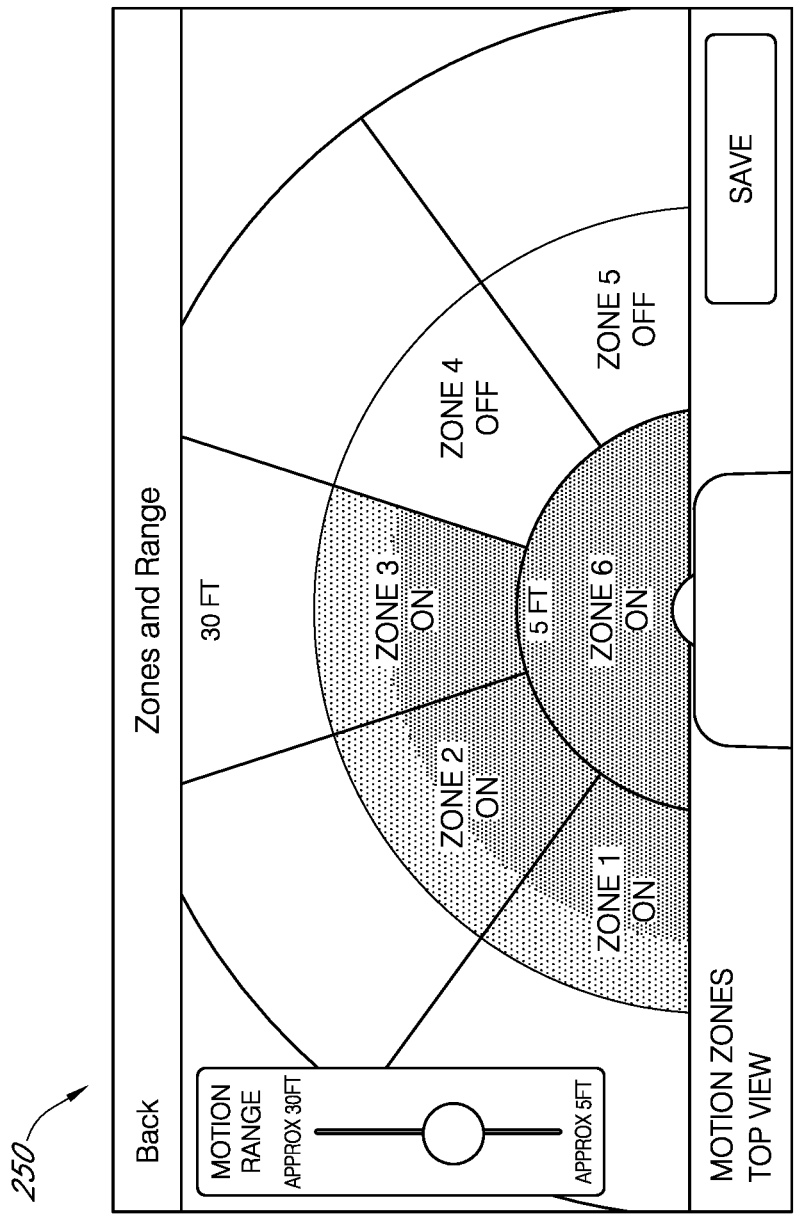
Figure 20:
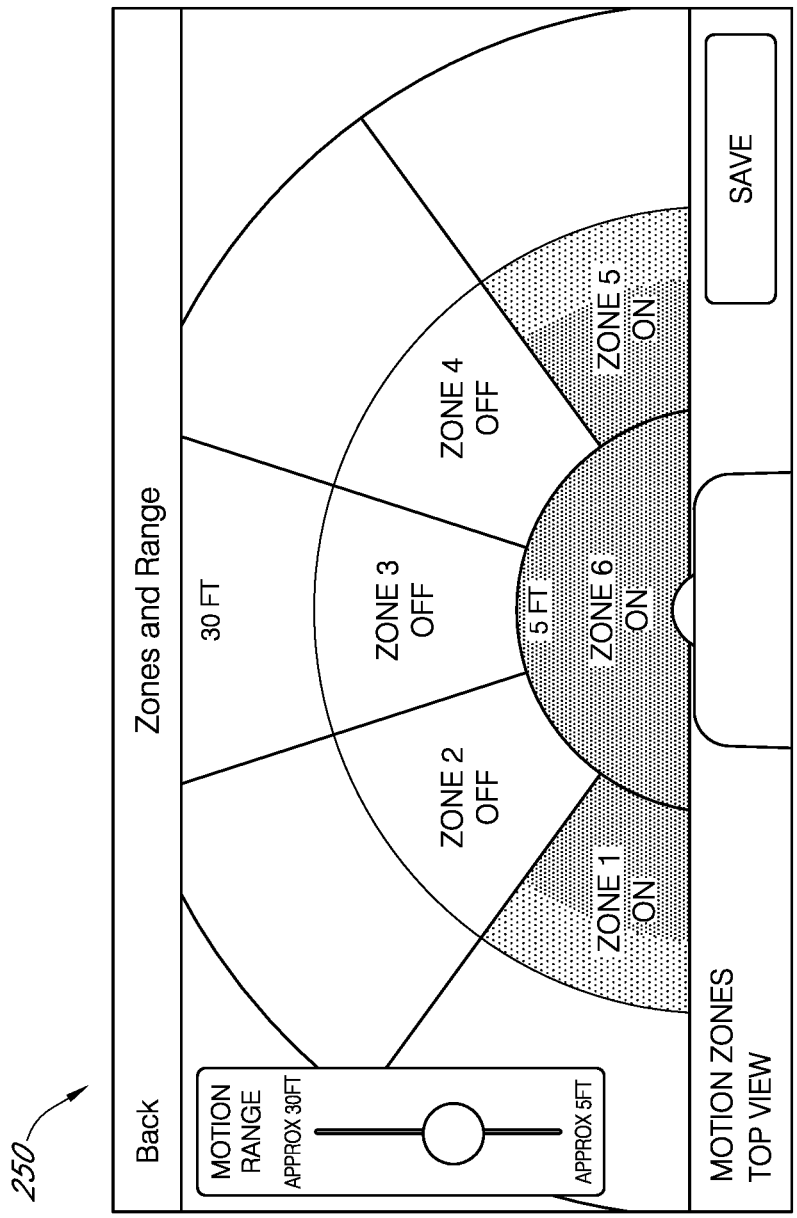
Figure 21:
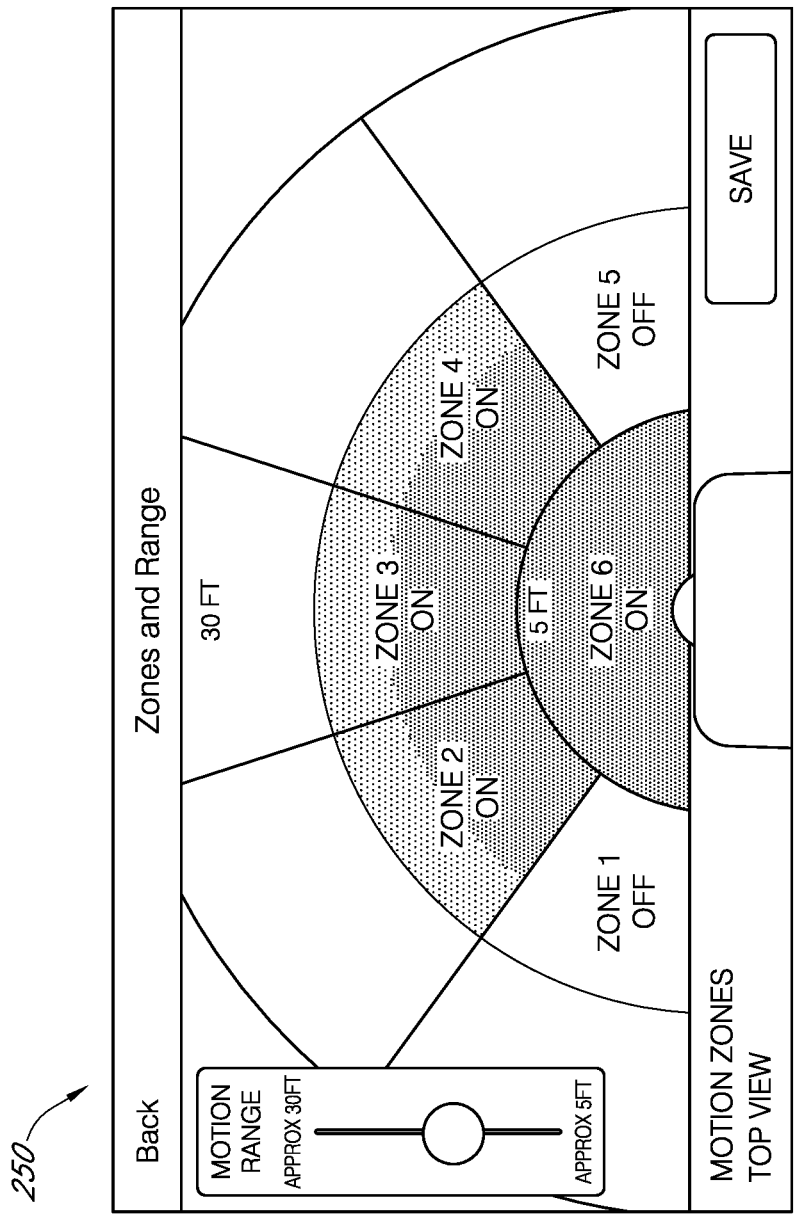
Figure 22:
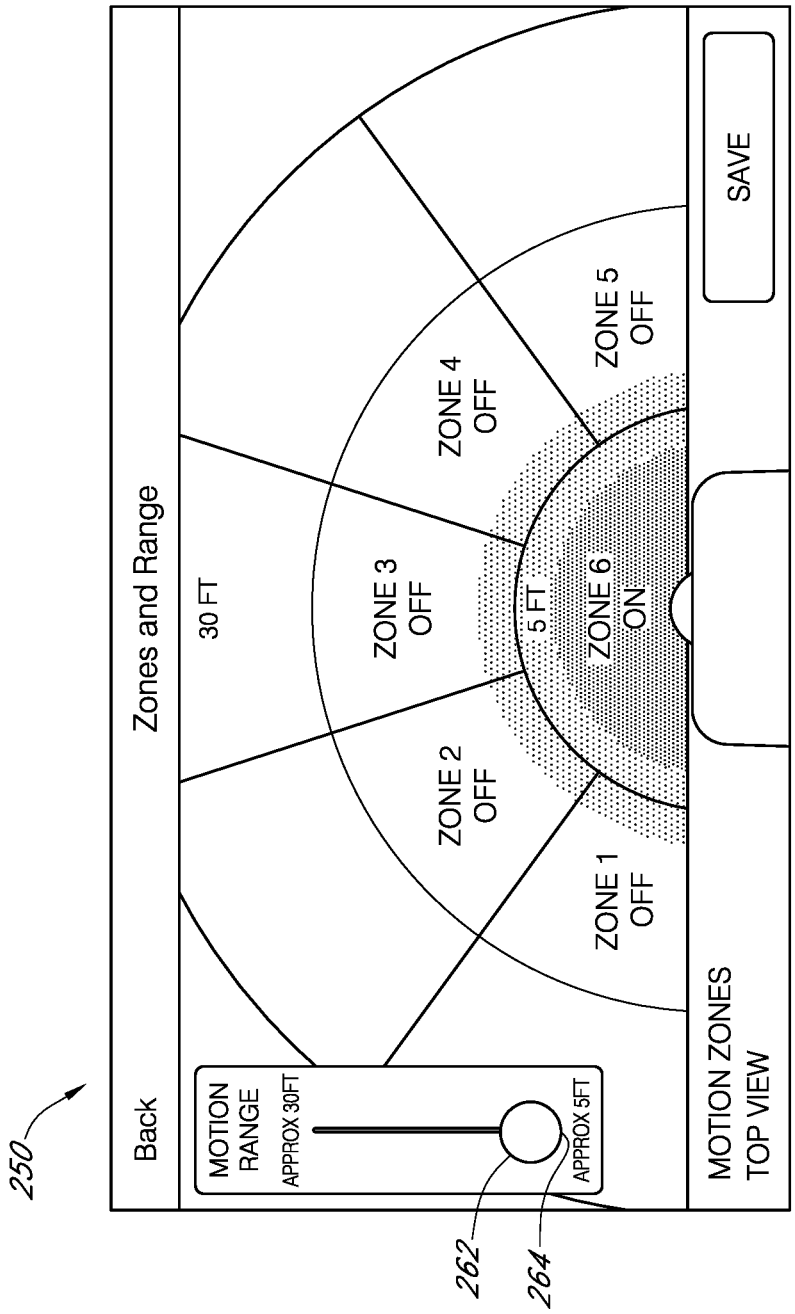
Figure 23:
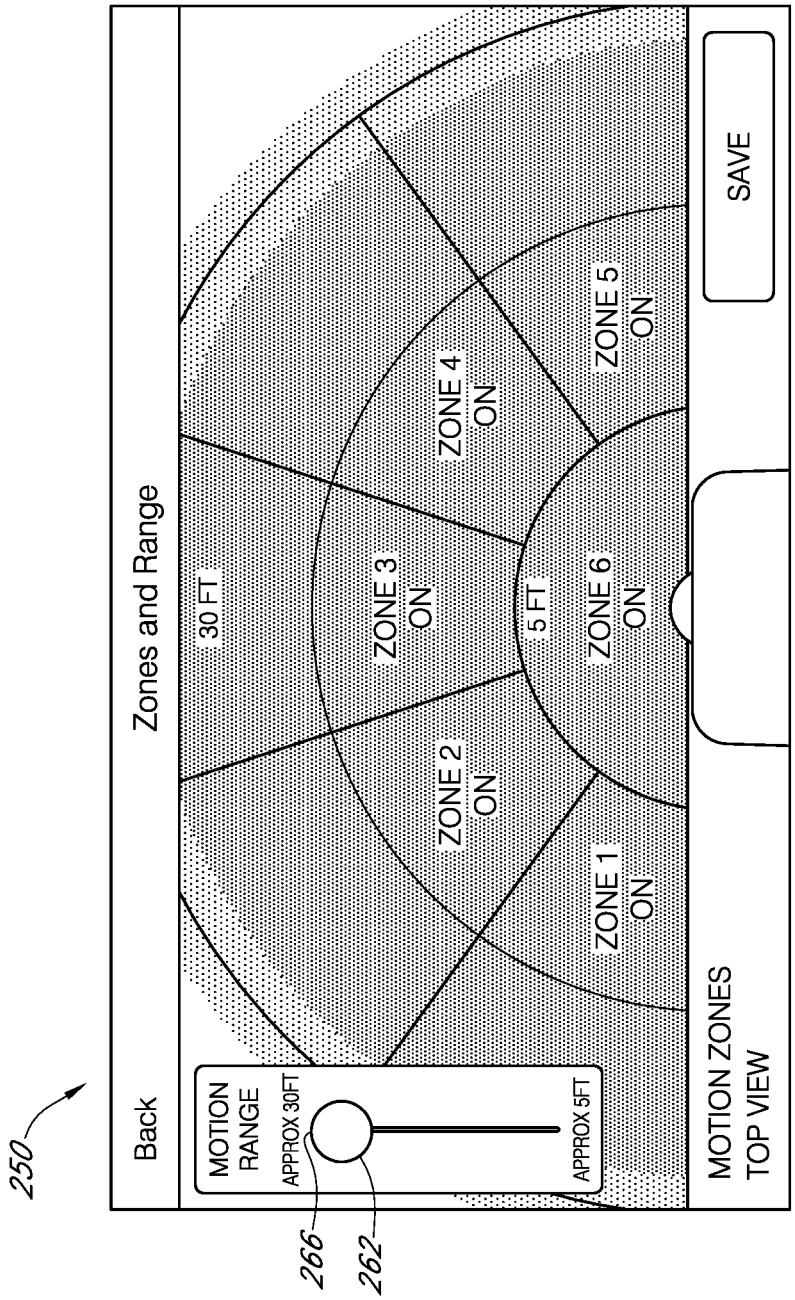

In certain of the present embodiments, the user may toggle individual zones ON and OFF independently of the other zones, such that any combination of zones may be ON at any given time. For example, FIGS. 18-21 illustrate some possible combinations. With reference to FIG. 18, Zones 1, 3, and 5 are OFF, while Zones 2, 4, and 6 are ON. With reference to FIG. 19, Zones 4 and 5 are OFF, while Zones 1-3 and 6 are ON. With reference to FIG. 20, Zones 2-4 are OFF, while Zones 1, 5, and 6 are ON. With reference to FIG. 21, Zones 1 and 5 are OFF, while Zones 2-4 and 6 are ON. With reference to FIG. 17, the GUI 250 further includes a SAVE button 258. When the user has set a desired zone configuration by toggling selected ones of the zones ON and OFF, he or she selects the SAVE button 258 to update the zone configuration setting for the A/V recording and communication doorbell 130. The user may then close the zone diagram 252 by selecting the BACK button 260, which may return the user to a previous screen (not shown) within the software application.

With further reference to FIG. 17, the GUI 250 may further include a range adjustment component 262 that enables the user to remotely modify the range of the passive infrared sensors 144. In the illustrated embodiment, the range adjustment component 262 comprises a slider widget. A first end 264, or lower end, of the range of the slider widget 262 corresponds to a minimum range of the passive infrared sensors 144, and a second end 266, or upper end, of the range of the slider widget 262 corresponds to a maximum range of the passive infrared sensors 144. The first and second ends 264, 266 of the slider widget 262 may include text indicating the distance corresponding to the minimum and maximum ranges of the passive infrared sensors 144. In the illustrated embodiment, the minimum range is indicated as approximately five feet, while the maximum range is indicated as approximately thirty feet. These ranges are merely examples, and are not limiting. In fact, in certain embodiments the textual indicators of the minimum and maximum ranges may not be provided at all.

With further reference to FIG. 17, the current setting of the range of the passive infrared sensors 144 is indicated on the zone diagram 252 by contrasting colors or shades of the same color, with a darker area 268 indicating the area where the passive infrared sensors 144 will trigger motion alerts (the ON area 268), and a lighter area 270 indicating the area where the passive infrared sensors 144 will not trigger motion alerts (the OFF area 270). A transition area 272 between the ON area 268 and the OFF area 270 is indicated by a color/shade between the darker area 268 and the lighter area 270, with the color of the transition area 272 fading gradually toward the OFF area 270. In certain embodiments, the transition area 272 is part of the ON area 268, such that the passive infrared sensors 144 will trigger motion alerts in the transition area 272, but in other embodiments the transition area 272 may be part of the OFF area 270, such that the passive infrared sensors 144 will not trigger motion alerts in the transition area 272.

In the configuration of FIG. 17, the range of the passive infrared sensors 144 is set roughly halfway between the minimum and maximum settings. By contrast, in the configuration of FIG. 22, the range of the passive infrared sensors 144 is set to the minimum (slider widget 262 at first end 264), and in the configuration of FIG. 23, the range of the passive infrared sensors 144 is set to the maximum (slider widget 262 at second end 266). When the user has set a desired range for the passive infrared sensors 144, he or she selects the SAVE button 258 to update the range setting for the A/V recording and communication doorbell 130. The user may then close the zone diagram 252 by selecting the BACK button 260, which may return the user to a previous screen (not shown) within the software application. In the illustrated embodiment, the ranges of the passive infrared sensors 144 may not be adjusted individually. That is, any movement of the slider widget 262 simultaneously adjusts the range of all of the passive infrared sensors 144. However, alternative embodiments may enable the ranges of the passive infrared sensors 144 to be adjusted individually.

In certain of the present embodiments, if the user closes the zone diagram 252 (whether by selecting the BACK button 260, or exiting the application, or by any other action) without selecting the SAVE button 258, then any changes that the user may have made to the settings for the passive infrared sensors 144, such as toggling one or more of the sensors 144 ON or OFF, or adjusting a range of one or more of the sensors 144, will not be saved and will not be sent to the A/V recording and communication doorbell 130.

Figure 24:
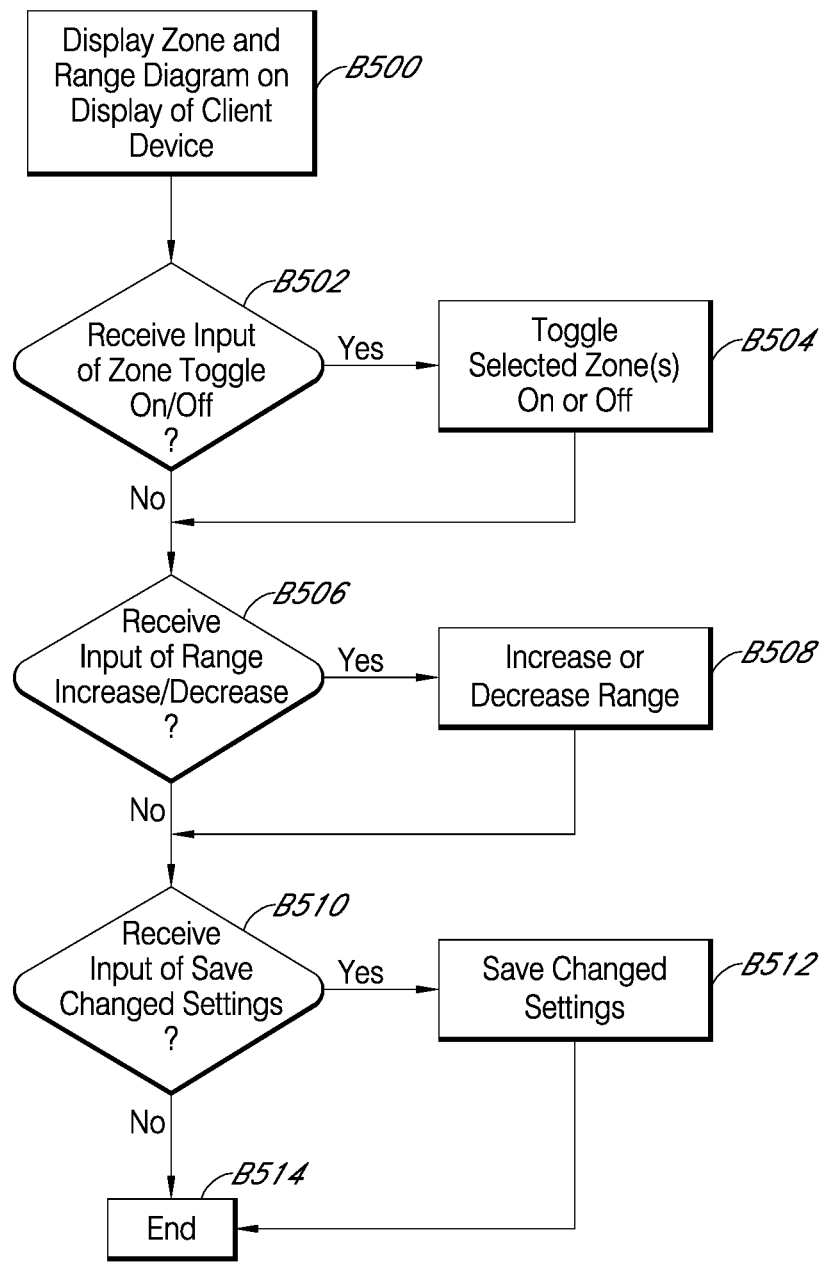
FIG. 24 is a flowchart illustrating a process for creating and/or customizing intrusion zones for an A/V recording and communication device according to various aspects of the present disclosure.

FIG. 24 is a flowchart showing an embodiment of a process according to the present disclosure. According to the process shown in FIG. 24, a user may remotely modify the settings of the A/V recording and communication doorbell 130. Referring to FIGS. 17 and 24, at block B500 a diagram 252 of the field of view about the A/V recording and communication doorbell 130 is displayed on a display of the user's computer or mobile device. The diagram 252 facilitates modifying the zone and range settings of the A/V recording and communication doorbell 130. For example, the user may toggle selected ones of the zones ON and OFF and/or increase and decrease a range (or sensitivity) of the passive infrared sensors 144, as described above with reference to FIGS. 17-23. The displaying of the diagram 252 on the display of the user's computer or mobile device may be performed by software executing on the user's computer or mobile device, for example.

With further reference to FIG. 24, at block B502 the process determines whether an input has been received to toggle a selected zone ON or OFF. The input may come from the user, for example according to the process described above with reference to FIGS. 17-23. If at least one input is received to toggle a selected zone ON or OFF, then the process moves to block B504, where the selected zone(s) is/are toggled ON or OFF. If, however, no input is received to toggle a selected zone ON or OFF, then the process moves to block B506.

At block B506, the process determines whether an input has been received to adjust the range of the passive infrared sensors 144. The input may come from the user, for example according to the process described above with reference to FIGS. 17, 22, and 23. If an input is received to adjust the range of the passive infrared sensors 144, then the process moves to block B508, where the range of the passive infrared sensors 144 is increased or decreased. If, however, no input is received to adjust the range of the passive infrared sensors 144, then the process moves to block B510.

At block B510, the process determines whether an input has been received to save any settings that may have been changed at either or both of block B502 and block B506. The input may come from the user, for example according to the processes described above with reference to FIGS. 17-23. If an input is received to save any changed settings, then the process moves to block B512, where the changed settings are saved, after which the process ends at block B514. If, however, no input is received to save any changed settings, then the process ends at block B514.

In certain embodiments, saving any changed settings may further comprise sending the changed settings to a server, such as (but not limited to) the server 118 (FIG. 1) or the server 900C (FIG. 33), from which the A/V recording and communication doorbell 130 may subsequently download the changed settings. For example, to implement the new conditional settings in the A/V recording and communication doorbell 130, the server 118/900C may communicate with the A/V recording and communication doorbell 130. In the process of the communication, the server 118/900C may provide the updated user settings and instruct the A/V recording and communication doorbell 130 to overwrite any previous conditional settings. This process may be performed in various ways. For example, and without limitation, the user may press the button 133 on the A/V recording and communication doorbell 130, thereby causing the communication to occur, or the A/V recording and communication doorbell 130 may detect motion and then initiate the communication with the server 118/900C, or a regular "check in" communication between the server 118/900C and the A/V recording and communication doorbell 130 may be implemented. In one aspect of the present disclosure, the changed settings may be compiled into a single communication to the A/V recording and communication doorbell 130 containing instructions for all zones, instead of sending numerous communications, piecemeal, for each zone.

After the settings of the A/V recording and communication doorbell 130 are changed, as described above, the user may then receive notifications consistent with the changed settings. In one aspect of the present disclosure, the system of the present disclosure may implement the settings by running software capable of analyzing the inputs from the passive infrared sensors 144, and then checking to see if the input is in accordance with the preferred settings. For example, assume the user modifies Zone 5, as shown in FIG. 15, so that no motion alerts are generated for any movement farther than ten feet away from the A/V recording and communication doorbell 130 in Zone 5. Also assume for purposes of this example that passive infrared sensor 144-3, which is responsible for Zone 5, has a maximum range of fifty feet, and thus can detect movement up to fifty feet away. The A/V recording and communication doorbell 130 may analyze movement based on the input from passive infrared sensor 144-3, and may determine the distance of the movement from the A/V recording and communication doorbell 130. If the A/V recording and communication doorbell 130 determines that the distance of the movement from the A/V recording and communication doorbell 130 is greater than ten feet, the A/V recording and communication doorbell 130 may ignore or filter out the movement and not initiate a communication with the system network (and the user will thus not receive a motion alert). The A/V recording and communication doorbell 130 may apply these principles to all zones and settings, and may also provide features that take into account possible false positive triggers, such as certain temperature conditions, light conditions, and/or moisture conditions, and determine whether a given input is a false detection. Whether or not false detections are ignored or filtered out may be governed by the preferred settings saved by the user.

In another aspect of the present disclosure, the user may manipulate physical controls, such as switches, sliders, or dials (not shown), located on the A/V recording and communication doorbell 130, in lieu of doing so with a remote software application.

In some embodiments, an aspect of the present disclosure comprises a graphical user interface (GUI) displayed on a display of a computing device for enabling modification of motion zones for a wireless communication doorbell. The GUI may comprise a diagram of a field of view about the wireless communication doorbell, the diagram including a plurality of motion zones within the field of view, with each motion zone delineated by boundary lines and enumerated with a unique motion zone identifier, wherein the zone diagram further includes an ON/OFF indicator for each motion zone. In some embodiments, each unique zone identifier may comprise a number. In some embodiments, the zone diagram may be a top view. Some embodiments may further comprise a range adjustment component that enables a range of each of the motion zones to be modified. In some embodiments, the range adjustment component may comprise a slider widget. In some embodiments, contrasting colors or shades of the same color may indicate areas where motion alerts will be triggered and areas where motion alerts will not be triggered. In some embodiments, the areas where motion alerts will be triggered may be indicated by a dark color or shade and the areas where motion alerts will not be triggered may be indicated by a light color or shade. Some embodiments may further comprise a transition area between the dark areas and the light areas, with the transition area having a gradually changing color or shade.

Although a plurality of motion sensors and motion zones are illustrated and discussed above with respect to FIGS. 17-24, in alternative embodiments a single motion sensor and/or motion zone may be used to satisfy the requirements of a specific implementation. Further, customization of motion settings could be performed without displaying a graphic of the field of view, e.g., a user could specify that any motion detected during certain hours is a red flag regardless of where the detected motion occurred. In addition, although specific embodiments for setting motion zones using A/V recording and communication doorbells are discussed above with respect to FIGS. 17-24, any of a variety of A/V recording and communication devices as appropriate to the requirements of a specific application may be used in accordance with embodiments of the present disclosure.

Figure 25:
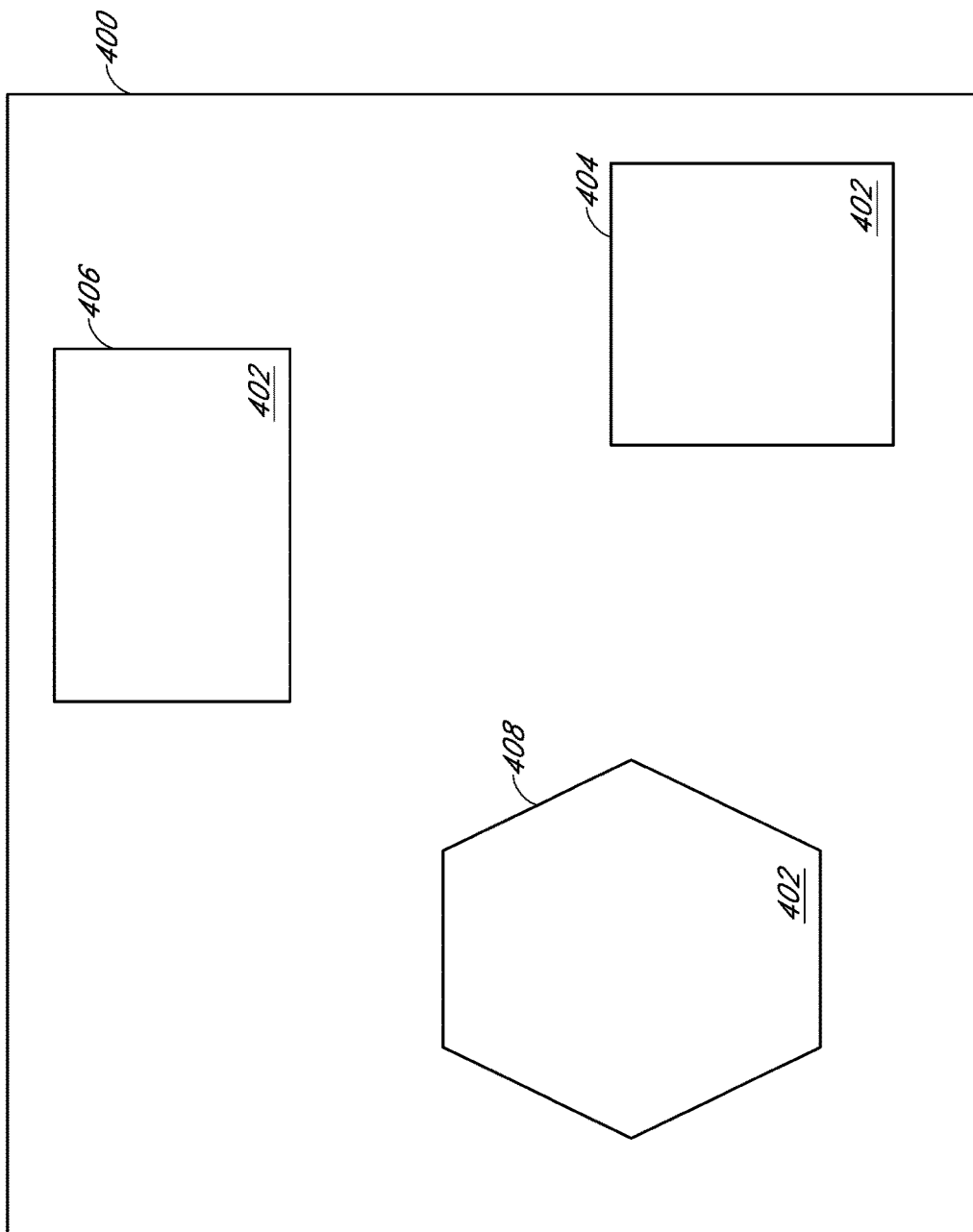
FIG. 25 is a schematic diagram of a technique for creating and/or customizing intrusion zones for an A/V recording and communication device according to various aspects of the present disclosure.
Figure 32:
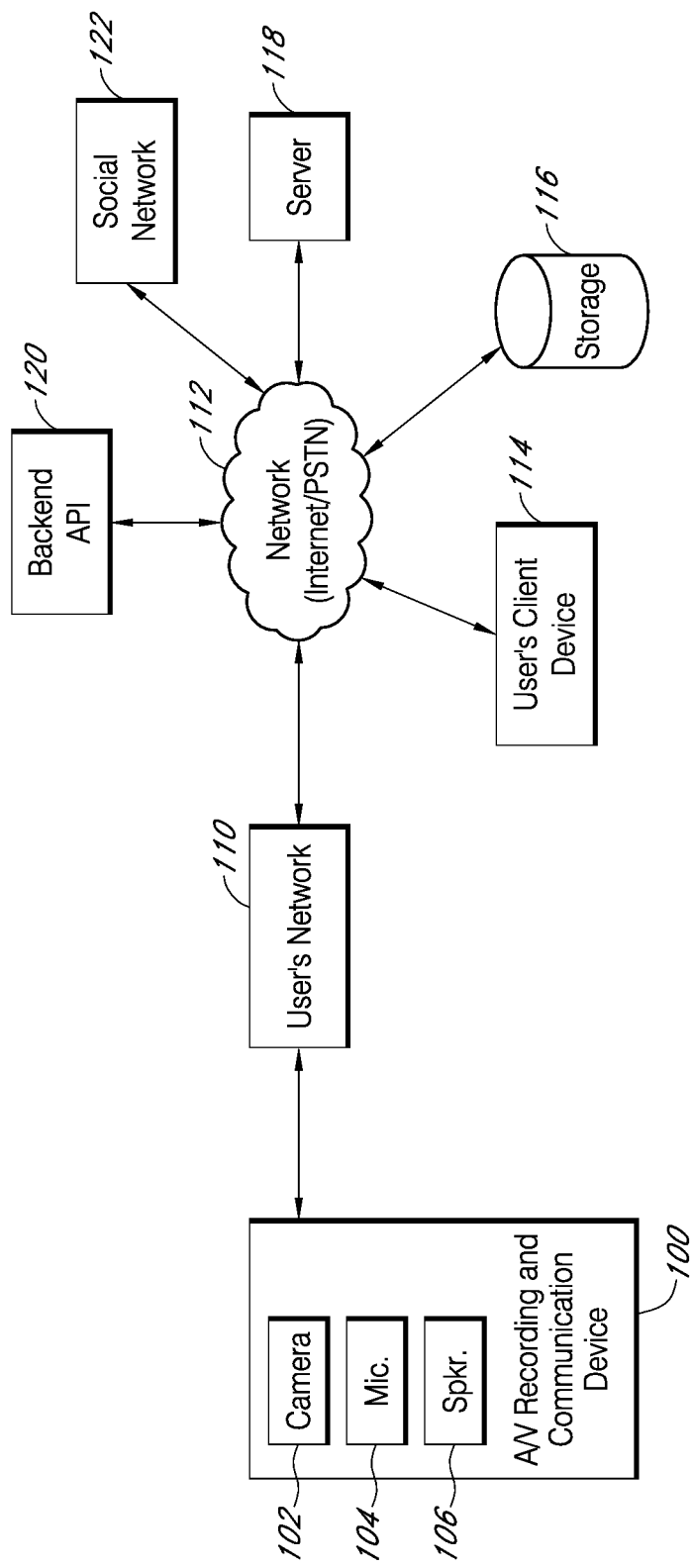
FIG. 32 is a functional block diagram illustrating a system for monitoring an intrusion zone using at least one conditional setting of an A/V recording and communication device according to various aspects of the present disclosure.

Some of the present embodiments provide advantageous motion detection processes and techniques. For example, during an initial setup process, or at any time after the A/V recording and communication doorbell 130 has been set up, the user may designate one or more zones within the field of view 400 of the camera 134 as motion zones of interest. With reference to FIG. 25, when configuring the camera 134's motion detection, a configuration process may present the user with a visual representation of the field of view 400 of the camera 134. For example, an application executing on the user's client device 800, such as a smartphone, may show a live view from the camera 134 of the user's A/V recording and communication doorbell 130 on the display 806 of the user's client device 114/800 (FIGS. 1 and 32). The configuration process may prompt the user to designate one or more motion zones of interest 402 by selecting areas on the display 806 of the user's client device 800. For example, the user may draw one or more polygons 404, 406, 408 on the display 806 to designate the motion zone(s) of interest 402. If the display 806 of the user's client device 800 is a touchscreen, the user may designate the motion zone(s) 402 by tracing the polygon(s) 404, 406, 408 on the display 806 with his or her finger. The configuration process may enable the user to designate motion zone(s) 402 having any shape and/or number of sides. For example, the motion zone(s) 402 may be regular polygons such as the square 404, rectangle 406, and hexagon 408 shown in FIG. 25, or any other type of regular polygon such as circles, pentagons, octagons, decagons, etc., or any type of irregular polygons. The configuration process may allow the user to designate any number of motion zones 402, such as one zone 402, two motion zones 402, three motion zones 402, etc. When all desired motion zones 402 have been created, the configuration process may prompt the user to save the motion zones 402, after which the created motion zones 402 may be sent from the user's client device 800 to a device in the network, such as a server 118/900C (FIGS. 1 and 33), and to the user's A/V recording and communication doorbell 130 via the user's network 110 (FIG. 1).

After one or more motion zones of interest 402 have been designated, embodiments of the present motion detection processes and techniques may incorporate those motion zones 402. For example, the camera 134, which may be powered on at all times, may continuously monitor motion within the field of view 400. The A/V recording and communication doorbell 130, however, may not begin recording and/or streaming video to the user's client device 114/800 unless and until a moving object enters one of the motion zones 402. The recording and/or streaming may continue until the moving object exits the motion zone 402 it earlier entered. Further, if the moving object stops moving, but remains in the motion zone 402, the recording and/or streaming may continue while the object remains stationary within the motion zone 402. This aspect of the present embodiments creates an advantage over systems that rely on other types of motion sensors, such as passive IR sensors, that typically only detect moving objects, and therefore do not typically record and/or stream stationary objects. The object may, of course, be a person.

As discussed above, one aspect of the present embodiments includes the realization that sometimes motion detected by an A/V recording and communication device may be indicative of a threat, such as an intruder, and other times the motion may be benign, such as motion caused by an invited visitor, a parcel delivery carrier, a neighbor, an animal, or a passing vehicle. It would be advantageous, therefore, if the functionality of A/V recording and communication devices could be enhanced in one or more ways to distinguish between various types of motion within the field of view of the A/V recording and communication device, and to generate alerts only when motion is detected and at least one conditional setting is satisfied. Such enhancements could increase the effectiveness of A/V recording and communication devices by providing a warning to the user when it is likely that detected motion is associated with a threat, while also possibly suppressing warnings to the user when it is unlikely that detected motion is associated with a threat. The user would thus be less likely to suffer alert fatigue due to persistent false alarms, thereby making it more likely that the user will respond to warnings that are associated with actual threats. The present embodiments provide these advantages and enhancements, as described below.

Figure 26:
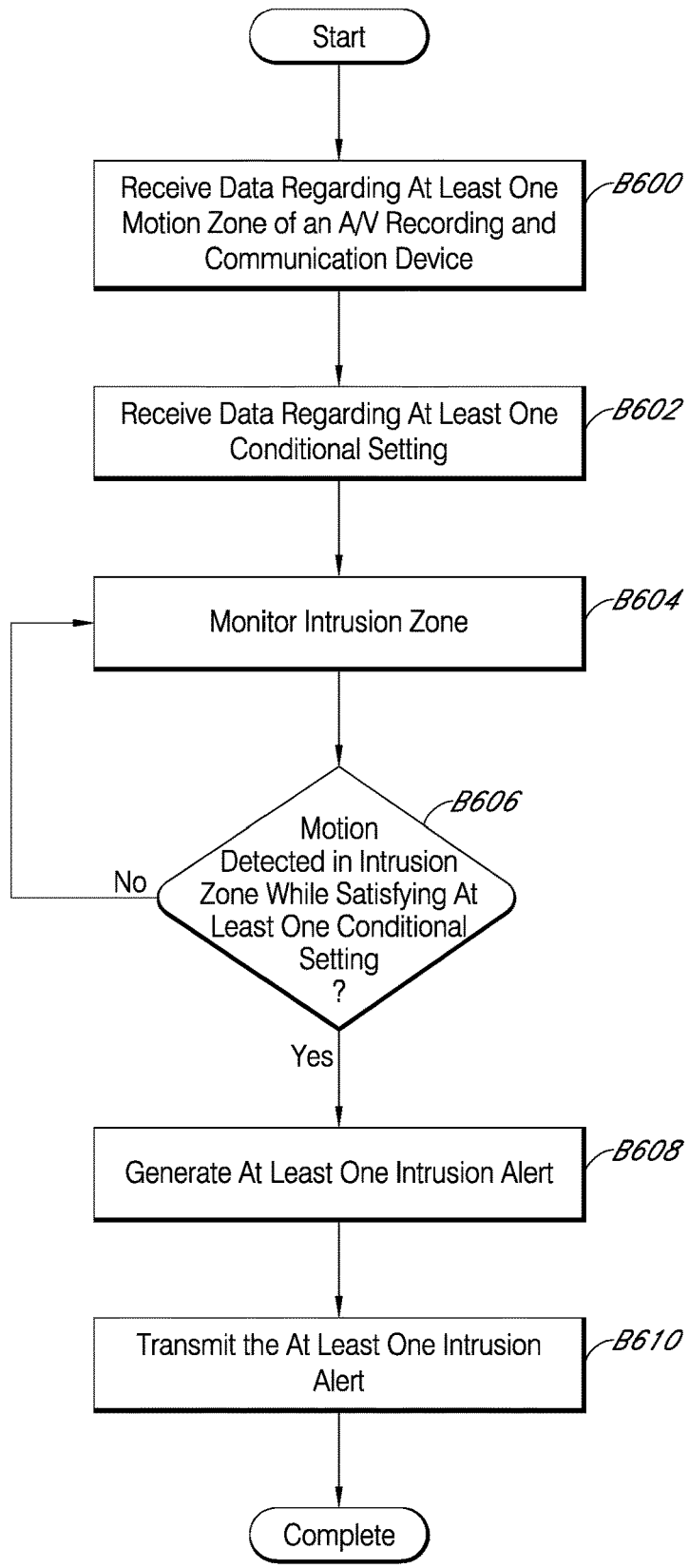
FIG. 26 is a flowchart illustrating a process for monitoring an intrusion zone using at least one conditional setting of an A/V recording and communication device according to various aspects of the present disclosure.

In some embodiments, the A/V recording and communication doorbell 130 may not begin recording and/or streaming video to the user's client device 114/800 until a moving object enters one of the motion zones 402 and a conditional setting is satisfied, as further discussed below. For example, FIG. 26 is a flowchart illustrating a process for monitoring an intrusion zone using at least one conditional setting of the A/V recording and communication device 130 according to various aspects of the present disclosure. The process may include receiving (block B600) data regarding the at least one motion zone. In some embodiments, the at least one motion zone may include one or more preset zones in the field of view of the A/V recording and communication doorbell 130, such as described above with respect to FIGS. 17-24. In other embodiments, the at least one motion zone may include one or more motion zones of interest, such as described above with respect to FIG. 25. For example, the at least one motion zone may comprise one or more shapes, such as (but not limited to) the shapes 404, 406, 408 illustrated in FIG. 25. The data regarding the at least one motion zone (may be referred to as motion zone data) may include (but is not limited to) one or more user preferences regarding the area(s) within the A/V recording and communication doorbell 130's field of view that the user desires for intrusion monitoring. As discussed above, the motion zone data may be received by displaying on a display of a computing device a user interface for creating and/or customizing at least one intrusion zone, where the at least one intrusion zone includes at least one motion zone within the field of view of the A/V recording and communication device coupled with at least one conditional setting of the at least one motion zone, as further described below.

In further reference to FIG. 26, the process may also include receiving (block B602) data regarding at least one conditional setting (may also be referred to as conditional setting data), as further described below. In various embodiments, conditional settings may be used to customize the user's preferences for monitoring the at least one motion zone. In various embodiments, a motion zone may be referred to as an intrusion zone when such motion zone is coupled with one or more conditional settings. For example, a conditional setting may include a time of day, e.g. if the detected motion occurs during a designated interval, such as between sunset and sunrise, or between midnight and 6:00 AM, then it may be indicative of a threat. In this case, if the conditional setting is satisfied (i.e. if the detected motion occurs during the designated interval), then one or more actions may be initiated, as described below. Other examples of conditional settings may include (but are not limited to) a level of ambient light (e.g. if the detected motion occurs during a period of low light, such as between sunset and sunrise, then it may be indicative of a threat), a location where the motion was detected (e.g. if the detected motion was inside the home (or in the front yard, or the back yard, or along the side of the home, etc.), then it may be indicative of a threat), a direction of movement of the person/object that caused the detected motion (e.g. if the person that caused the motion detection is moving toward the A/V recording and communication device, then it may be indicative of a threat), a speed of movement of the person/object that caused the detected motion (e.g. if the person that caused the motion detection is moving rapidly, then it may be indicative of a threat), a length of time that a person/object is within a motion zone (e.g. if the person that caused the motion detection remains in the motion zone for longer than a preset length of time, then it may be indicative of a threat), a level of reflecting light intensity (e.g. a metallic object carried by an intruder, such as a firearm, a knife, etc., might reflect light at an intensity higher than the surroundings and, therefore, if reflected light is above a threshold intensity then it may be indicative of a threat), and/or a body posture of a person within the motion zone (e.g. if the person that caused the motion detection is crouching, or laying prone, or assuming another posture that may indicate an intent to evade detection, then it may be indicative of a threat).

The process may also include monitoring (block B604) the at least one intrusion zone of the A/V recording and communication doorbell 130 to detect motion using processes and hardware as described above. During monitoring, the process may include determining (block B606) whether motion is detected in the at least one intrusion zone while satisfying at least one conditional setting. If motion is detected, but at least one conditional setting is not satisfied, then the process may continue to monitor (block B604) the at least one intrusion zone of the A/V recording and communication doorbell 130. However, in some embodiments, upon a determination that motion is detected and at least one conditional setting is satisfied, the process may include determining an intrusion zone action and executing the intrusion zone action, as further described below. For example, if motion is detected and at least one conditional setting is satisfied, then the process may include generating (block B608) at least one intrusion alert and transmitting (block B610) the at least one intrusion alert to a client device 114/800, a server 118/900C, and/or a social media network (not shown), as further described below.

Figure 27:
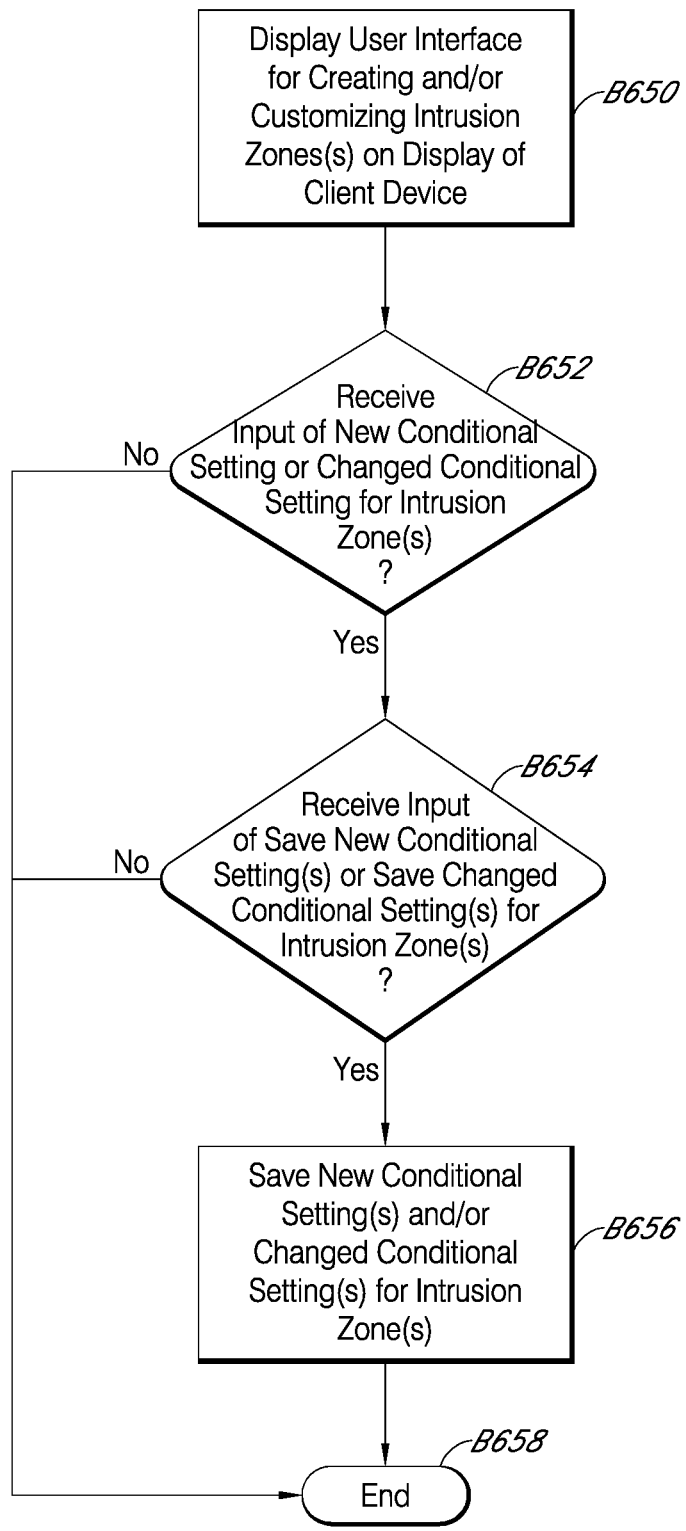
FIG. 27 is a flowchart illustrating a process for setting one or more new conditional settings and/or changing one or more existing conditional settings for intrusion zone(s) of an A/V recording and communication device according to various aspects of the present disclosure.

FIG. 27 is a flowchart illustrating a process for setting one or more new conditional settings and/or changing one or more existing conditional settings for intrusion zone(s) of an A/V recording and communication device 130 according to various aspects of the present disclosure. The process may include displaying (block B650) a user interface for creating and/or customizing at least one intrusion zone on the display 806 of the client device 800 (FIG. 32). In various embodiments, the user interface may be configured to present options for the user to indicate preferences for conditional settings, such as (but not limited to) a time of day, a level of ambient light, a direction of movement (of the person/object that caused the detected motion), a speed of movement (of the person/object), a length of time that a person/object is within a motion zone, a level of reflecting light intensity, and/or a body posture of a person within the motion zone. As discussed above, the user interface may include at least one area within the field of view of the A/V recording and communication device for monitoring, such as (but not limited to) the zones discussed above with respect to FIGS. 17-25. For example, the user interface may include a diagram that includes at least one motion zone within the field of view of the A/V recording and communication device. If the diagram indicates a plurality of motion zones, each of the plurality of motion zones may be delineated by boundary lines, and each of the motion zones may be enumerated with a unique zone number. In some embodiments, the process may include receiving motion zone data, such as (but not limited to) a selection of the at least one motion zone, where the selection indicates the user's preference for one or more areas within the field of view of the A/V recording and communication device for intrusion detection.

In further reference to FIG. 27, the process may further include receiving (block B652) conditional setting data, such as (but not limited to) input of new conditional settings and/or changed conditional settings for at least one intrusion zone. If such inputs are not received, then the process may end (block B658). However, if such inputs are received, then the process may include receiving (block B654) input to save the new conditional settings and/or to save the changed conditional settings for the intrusion zone(s). If inputs to save settings are not received, then the process may end (block B658). However, if inputs to save settings are received, then the process may include saving (block B656) the new conditional settings and/or changed conditional settings for the at least one intrusion zone. In some embodiments, the saving of the new conditional settings and/or changed conditional settings may include transmitting a setting save signal to the server 118/900C.

Figure 28:
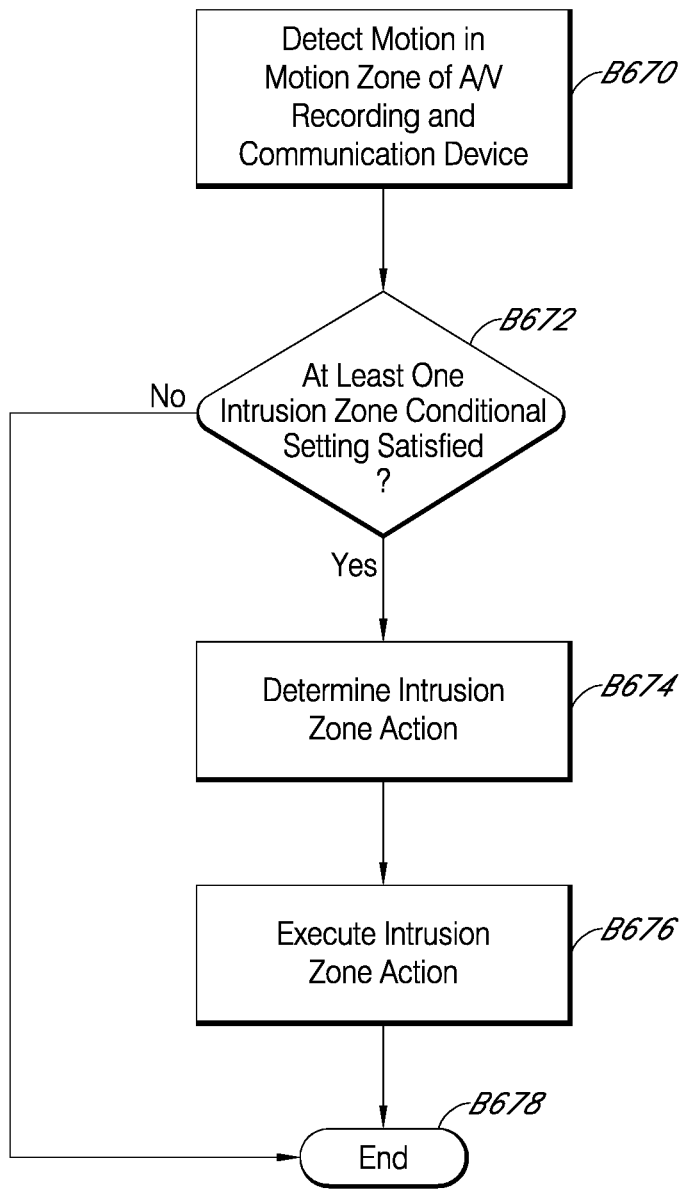
FIG. 28 is a flowchart illustrating a process for taking an action based upon a conditional setting for an intrusion zone of an A/V recording and communication device according to various aspects of the present disclosure.

FIG. 28 is a flowchart illustrating a process for taking an action based upon a conditional setting for an intrusion zone of an A/V recording and communication device according to various aspects of the present disclosure. The process may include monitoring and detecting (block B670) motion in at least one motion zone of the A/V recording and communication device, such as (but not limited to) the A/V recording and communication doorbell 130. In some embodiments, motion may be detected using the PIR sensors 144 and/or the camera 102/134, as described above. Upon detecting motion, the process may include determining (block B672) whether at least one intrusion zone conditional setting is satisfied. For example, if a conditional setting of the at least one intrusion zone comprises a time of day, then the process may compare a current time to a set time interval to determine whether the detected motion occurred during the set time interval. In another example, if a conditional setting of the at least one intrusion zone comprises a level of ambient light, then the process may compare a current level of ambient light to a set level of ambient light to determine whether the detected motion occurred during a period of low ambient light. In another example, if a conditional setting of the at least one intrusion zone comprises a location where the motion was detected, then the process may determine if the location where the motion was detected matches one or more preset locations. In another example, if a conditional setting of the at least one intrusion zone comprises a direction of movement, then the process may determine a direction of movement of the person/object that caused the detected motion to determine whether the detected direction of movement matches the set direction of movement. In another example, if a conditional setting of the at least one intrusion zone comprises a speed of movement, then the process may compare a speed of movement of the person/object that caused the detected motion to a set threshold speed to determine whether the detected speed of movement is above or below the set threshold speed. In another example, if a conditional setting of the at least one intrusion zone comprises a length of time that a person/object remains within a motion zone, then the process may compare a length of time that a person/object remains within a motion zone to a set threshold time to determine whether the detected length of time is above or below the set threshold length of time. In another example, if a conditional setting of the at least one intrusion zone comprises a level of reflecting light intensity, then the process may compare a detected level of reflecting light intensity to a set threshold intensity to determine whether the detected level of reflecting light intensity is above or below the set threshold intensity. In another example, if a conditional setting of the at least one intrusion zone comprises a body posture of a person within the motion zone, then the process may compare a detected body posture of a person within the motion zone to one or more preset body postures to determine whether the detected body posture of a person within the motion zone matches the one or more preset body postures.

In further reference to FIG. 28, if no conditional setting is satisfied, the process may end (block B678). However, if at least one conditional setting is satisfied, then the process may include determining (block B674) and executing (block 676) at least one intrusion zone action. In some embodiments, the intrusion zone action may include generating an intrusion alert and transmitting it to a client device 114/800. In various embodiments, the intrusion alert may be transmitted to the client device 114/800 even when motion alerts are inactive for the at least one motion zone where the motion was detected. For example, if motion is detected but motion alerts are inactive for the at least one motion zone where the motion was detected, then no alert may be sent unless at least one conditional setting is also satisfied. Further, the intrusion alert may include a notification about a type of alert based on the particular conditional setting that was satisfied. For example, if the particular conditional setting that was satisfied comprises a location of motion detection, then the intrusion alert may include a notification that identifies where the motion was detected (e.g., inside the home, or in the front yard, or in the backyard, or along the side of the home, etc.). The intrusion alert may further include an indication of the at least one motion zone where the motion was detected.

In further reference to FIG. 28, the intrusion action may include a variety of actions to combat an unwanted presence of an intruder. For example, in some embodiments, the intrusion action may include activating at least one lighting device to illuminate the area surrounding the A/V recording and communication doorbell 130. In further embodiments, the intrusion action may include transmitting an intrusion alert to the server 118/900C for providing a warning message about the detected motion to at least one social network 122 (FIG. 32). The social network 122 may include any social media service or platform that uses computer-mediated tools that allow participants to create, share, and/or exchange information in virtual communities and/or networks, such as (but not limited to) social networking websites and/or applications running on participant devices. Non-limiting examples of social networks include Facebook, Twitter, Snapchat, and Nextdoor. The intrusion action may also include transmitting an intrusion alert to a first client device or set of client devices that differs from a second client device or set of client devices, where the second client device or set of client devices may have been designated to receive an alert when motion is detected but no conditional settings were satisfied. Further, the intrusion action may include activating an intruder intervention module configured to intervene with a person that may have caused the detected motion. Such intervention may include emitting a warning sound and/or a recorded warning message using the speaker 157 of the A/V recording and communication doorbell 130.

Figure 29:
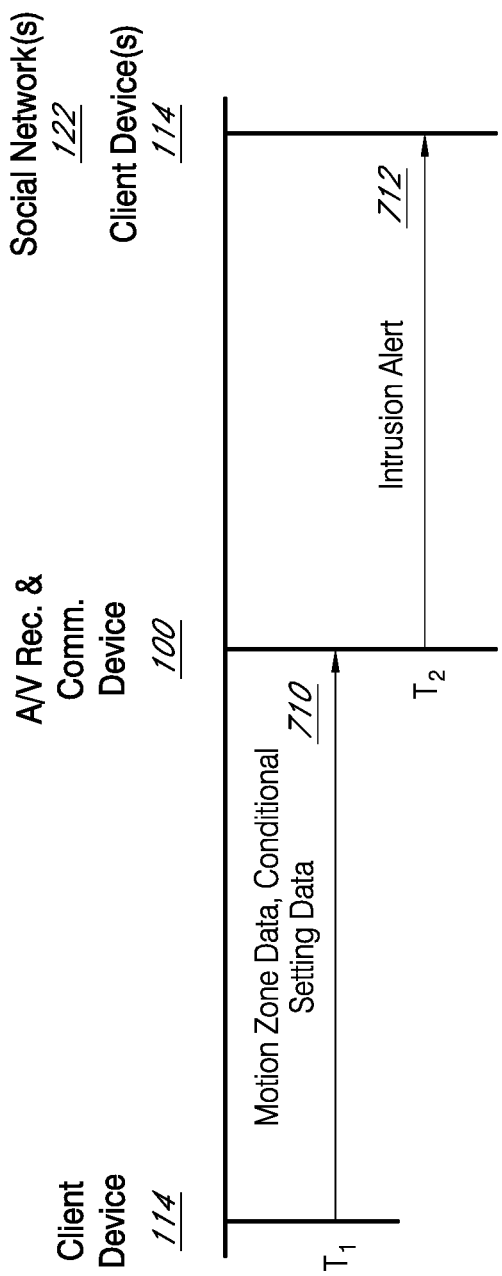
FIGS. 29-31 are sequence diagrams illustrating embodiments of processes for monitoring an intrusion zone using at least one conditional setting of an A/V recording and communication device according to various aspects of the present disclosure.
Figure 30:
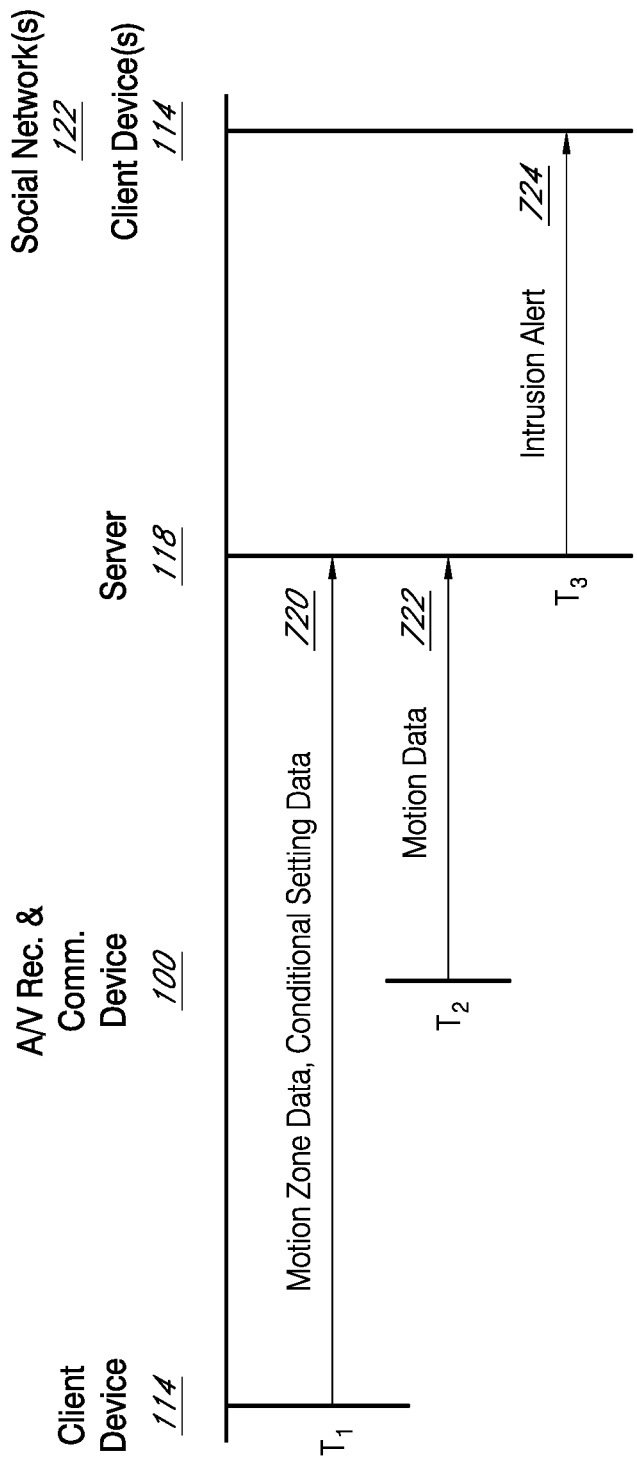
Figure 31:
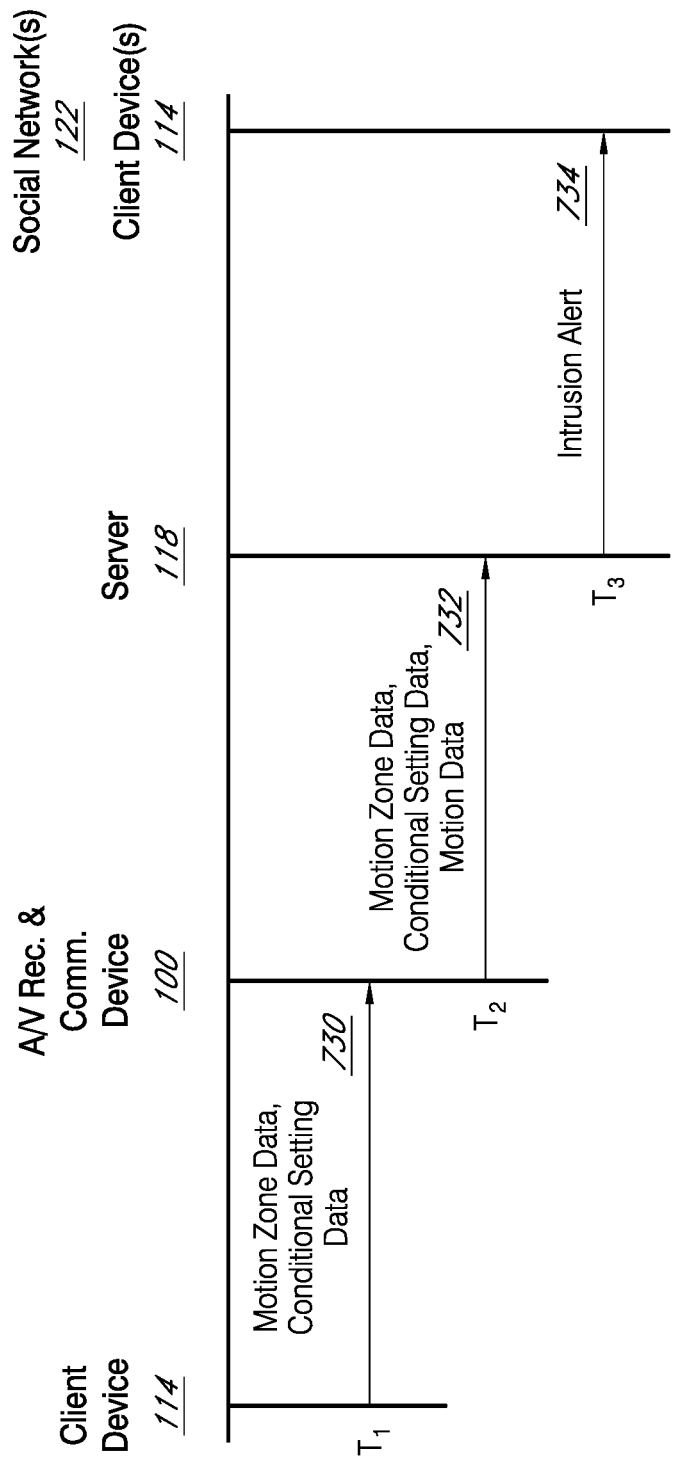

FIGS. 29-31 are sequence diagrams illustrating embodiments of processes for monitoring an intrusion zone using at least one conditional setting according to various aspects of the present disclosure. With reference to FIG. 29, the process may include a client device 114, an A/V recording and communication device 100, and at least one social network 122 (FIG. 32). In such embodiments, at a time $T_1$, the client device 114 may transmit motion zone data and conditional setting data 710 (may also be referred to as "first signal 710") to the A/V recording and communication device 100. Prior to transmitting the first signal 710, the client device 114 may be configured to receive motion zone data and conditional setting data from a user, as discussed above. In various embodiments, the A/V recording and communication device 100 receives the motion zone data and conditional setting data 710 and may be configured to monitor at least one intrusion zone comprising at least one motion zone coupled with at least one conditional setting, as discussed above. Upon detecting motion in the at least one intrusion zone while satisfying at least one conditional setting, the A/V recording and communication device 100 may generate and transmit an intrusion alert 712 back to the client device 114 and/or to at least one social network 122 at a time $T_2$, and the at least one social network 122 and/or the client device 114 may receive the transmitted intrusion alert 712 from the A/V recording and communication device 100. In various embodiments, the intrusion alert 712 may be transmitted to, and received by, at least one other client device 114 in addition to, or instead of, the client device 114 that transmitted the motion zone data and the conditional setting data 710 to the A/V recording and communication device 100.

In reference to FIG. 30, the process may include a client device 114, an A/V recording and communication device 100, a server 118, and at least one social network 122. In such embodiments, at a time $T_1$, the client device 114 may transmit motion zone data and conditional setting data 720 (may also be referred to as "first signal 720") to the server 118. Prior to transmitting the first signal 720 to the server 118, the client device 114 may be configured to receive motion zone data and conditional zone data input from a user, as discussed above. At a time $T_2$, the A/V recording and communication device 100 may transmit a second signal 722 comprising data related to motion (may be referred to as motion data) captured using its camera 102, PIR sensor(s) 144, and/or any other suitable motion detecting sensor or device. In some embodiments, time $T_2$ may be after time $T_1$, while in other embodiments time $T_2$ may substantially coincide with time $T_1$ (e.g., the first signal 720 and the second signal 722 may be transmitted at substantially the same time). Upon receiving the first and second signals 720, 722, the server 118 may transmit an intrusion alert 724 to at least one social network 122 and/or to the client device 114 at a time $T_3$. Likewise, the at least one social network 122 and/or the client device 114 may receive the transmitted intrusion alert 724 from the server 118. In various embodiments, the intrusion alert 724 may be transmitted to, and received by, at least one other client device 114 in addition to, or instead of, the client device 114 that transmitted the motion zone data and the conditional setting data 720 to the server 118.

In reference to FIG. 31, the process may include a client device 114, an A/V recording and communication device 100, a server 118, and at least one social network 122. In such embodiments, at a time $T_1$, the client device 114 may transmit motion zone data and conditional setting data 730 to the A/V recording and communication device 100. Prior to transmitting the motion zone data and the conditional setting data 730, the client device 114 may be configured to receive motion zone data and conditional zone data input from a user, as discussed above. At a later time $T_2$, the A/V recording and communication device 100 may transmit a combined signal 732 to the server 118, the combined signal 732 comprising the motion zone data and the conditional setting data 730 received from the client device 114 along with motion data captured by the A/V recording and communication device 100. Prior to transmitting the combined signal 732 to the server 118, the A/V recording and communication device 100 may capture the motion data using its camera 102, PIR sensor(s) 144, and/or any other suitable motion detecting sensor or device. Upon receiving the transmitted combined signal 732 from the A/V recording and communication device 100, the server 118 may transmit an intrusion alert 734 to the at least one social network 122 and/or the client device 114 at a time $T_3$, and the at least one social network 122 and/or the client device 114 may receive the transmitted intrusion alert 734 from the server 118. In various embodiments, the intrusion alert 734 may be transmitted to, and received by, at least one other client device 114 in addition to, or instead of, the client device 114 that transmitted the motion zone data and the conditional setting data 730 to the server 118.

Figure 33:
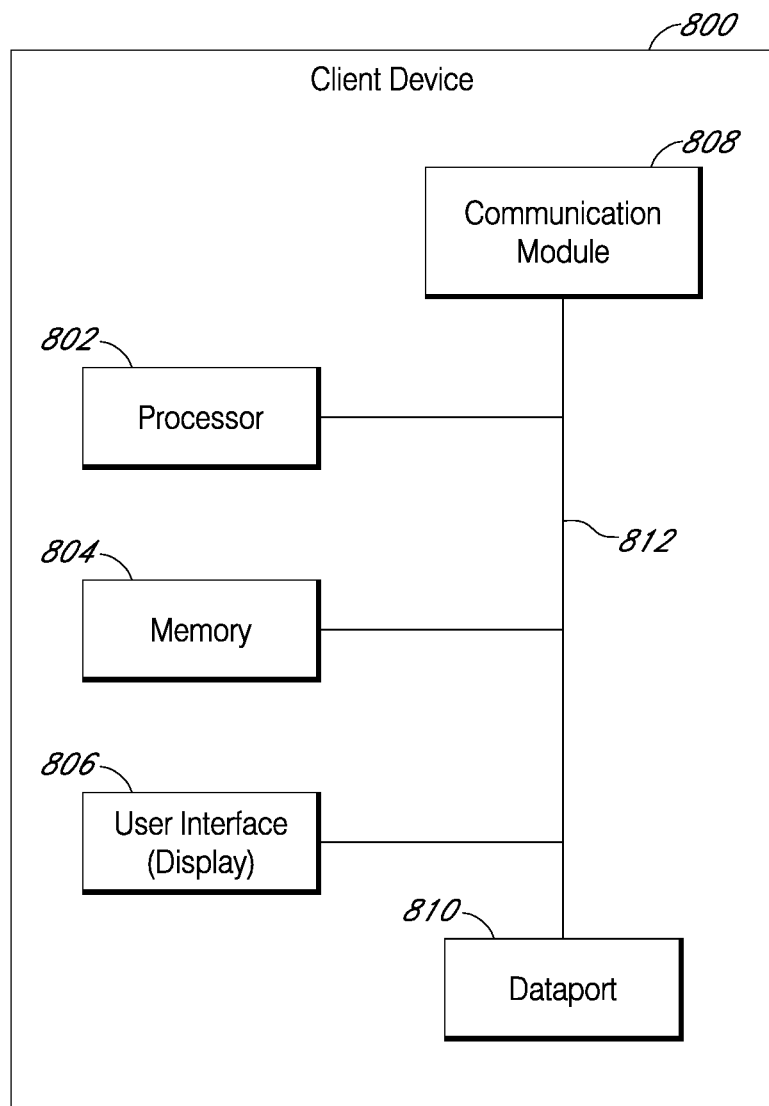
FIG. 33 is a functional block diagram of a client device on which the present embodiments may be implemented according to various aspects of the present disclosure.

FIG. 33 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 33, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM)). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 34:
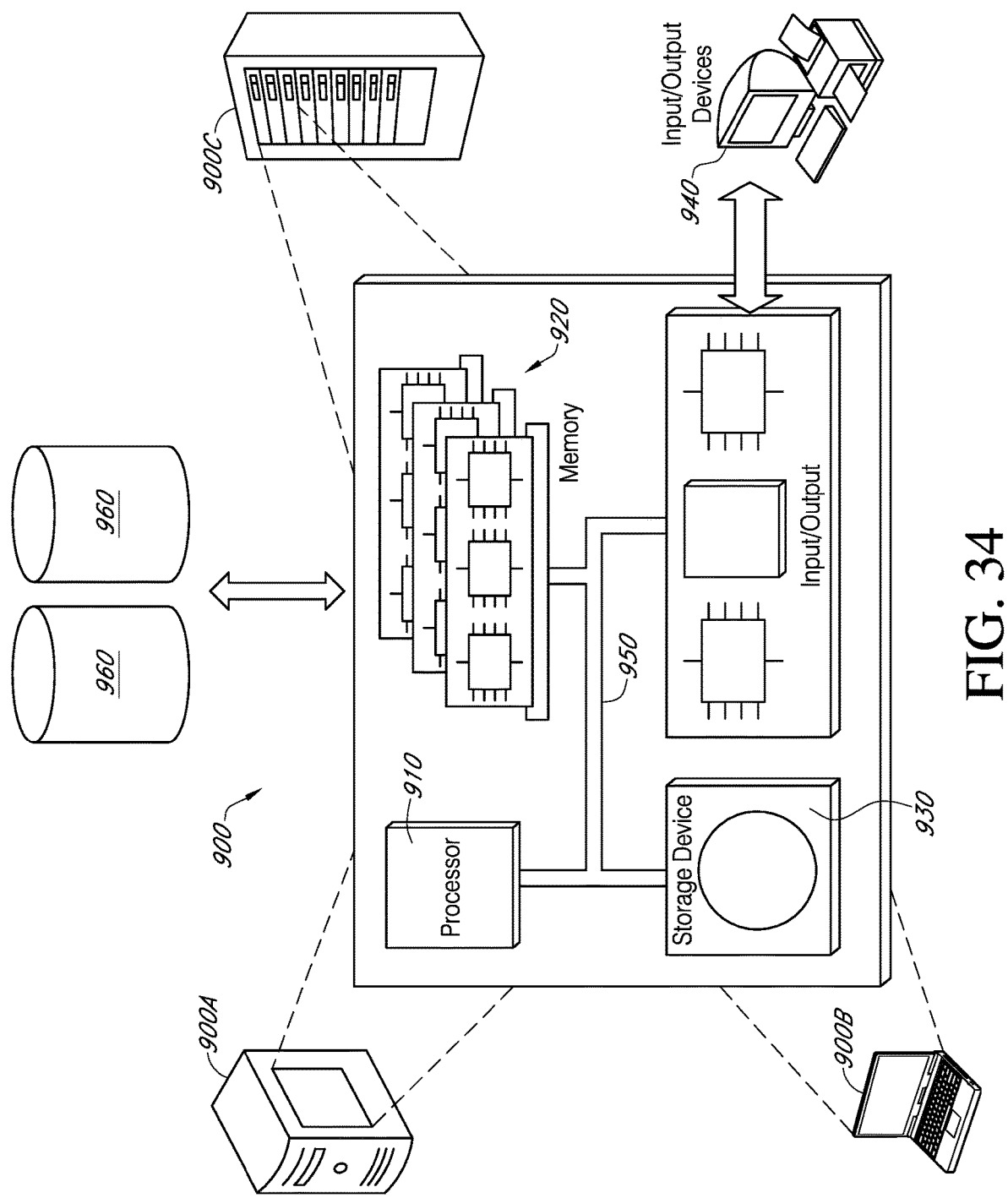
FIG. 34 is a functional block diagram of a general-purpose computing system on which the present embodiments may be implemented according to various aspects of present disclosure.

FIG. 34 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:
    sending, to a display, first data representing a diagram, the diagram representing a field of view (FOV) associated with an audio/video recording and communication device (A/V device), the diagram including boundary lines associated with a plurality of motion zones;
    receiving second data representing a first input;
    determining that the first input is associated with a first portion of the FOV;
    sending, to the display, third data that causes the diagram to indicate that the first portion of the FOV was selected;
    receiving fourth data representing a second input; determining that the second input indicates a first distance range associated with the first portion of the FOV;
    sending, to the display, fifth data that causes the diagram to indicate the first distance range; and
    sending, to a system, sixth data that associates the first portion of the FOV with the first distance range;
    wherein the determining that the first input is associated with the first portion of the FOV comprises determining that the first input selects a motion zone from the plurality of motion zones, the motion zone corresponding to the first portion of the FOV; and
    wherein the third data causes the diagram to indicate that the motion zone is selected.

2. The method of claim 1, further comprising sending, to the display, seventh data representing a zone number associated with the motion zone.

3. The method of claim 1, wherein the first portion of the FOV is associated with a first motion sensor of the A/V device, and wherein a second portion of the FOV is associated with a second motion sensor of the A/V device.

4. The method of claim 1, further comprising:
    receiving seventh data representing a third input; determining that the third input is associated with a second portion of the FOV;
    sending, to the display, eighth data that causes the diagram to indicate that the second portion of the FOV was selected;
    receiving ninth data representing a fourth input; determining that the fourth input indicates a second distance range associated with the second portion of the FOV;
    sending, to the display, tenth data that causes the diagram to indicate the second distance range; and
    sending, to the system, eleventh data that associates the second portion of the FOV with the second distance range.

5. The method of claim 1, further comprising generating the sixth data, the sixth data representing at least:
    the first portion of the FOV;
    the first distance range; and
    a command to associate the first portion of the FOV with the first distance range.

6. The method of claim 1, further comprising generating the sixth data, the sixth data representing at least:
    an angle associated with the FOV, the angle corresponding to the first portion of the FOV; and
    the first distance range.

7. The method of claim 1, wherein the sending of the third data that causes the diagram to indicate that the first portion of the FOV was selected comprises sending, to the display, the third data that causes a portion of the diagram to change from a first characteristic to a second characteristic, the portion of the diagram representing the portion of the FOV.

8. The method of claim 1, wherein the sending of the fifth data that causes the diagram to indicate the first distance range comprises sending, to the display, the fifth data that causes a portion of the diagram to change from a first characteristic to a second characteristic, the portion of the diagram representing the first portion of the FOV.

9. The method of claim 8, wherein:
    the first characteristic comprises at least one of:
        first text;
        a first color; or
        a first shading; and
    the second characteristic comprises at least one of:
        second text;
        a second color; or
        a second shading.

10. A method comprising:
   storing first data representing a first portion of a field of view (FOV) associated with an audio/video recording and communication device (A/V device):
   storing second data that associates a first distance range with the first portion of the FOV;
   receiving third data generated by at least a first sensor of the A/V device;
   determining, based at least in part on the third data, that the A/V device detected first motion associated with the first portion of the FOV;
   determining, based at least in part on the third data, that the first motion occurred within the first distance range;
   based at least in part on the determining that the A/V device detected the first motion associated the first portion of the FOV and the determining that the first motion occurred within the first distance range, performing an action;
   receiving fourth data generated by at least the first sensor;
   determining, based at least in part on the fourth data, that the A/V device detected second motion associated with the first portion of the FOV;
   determining, based at least in part on the fourth data, that the second motion occurred outside of the first distance range; and
   based at least in part on the determining that the second motion occurred outside of the first distance range, refraining from again performing the action.

11. The method of claim 10, wherein the performing of the action comprises sending an alert to a system.

12. The method of claim 10, wherein the performing of the action comprises activating a lighting device.

13. The method of claim 10, wherein the performing of the action comprises outputting a sound using a speaker of the A/V device.

14. The method of claim 10, further comprising receiving, from at least one of a user device or a system, fifth data representing at least:
   the first portion of the FOV; and
   the first distance range,
   wherein the storing of the second data is based at least in part on the receiving of the fifth data.

15. The method of claim 10, wherein the first sensor is associated with the first portion of the FOV and a second sensor is associated with a second portion of the FOV, and wherein the determining that the A/V device detected the first motion associated with the first portion of the FOV comprises:
   determining, based at least in part on the third data, that the first sensor detected the first motion; and
   determining that the A/V device detected the first motion associated with the first portion of the FOV based at least in part on the first sensor being associated with the first portion of the FOV.

16. The method of claim 10, wherein the first sensor is associated with the first distance range and a second sensor is associated with a second distance range, and wherein the determining that the first motion occurred within the first distance range comprises:
   determining, based at least in part on the third data, that the first sensor detected the first motion; and
   determining that the first motion occurred within the first distance range based at least in part on the first sensor being associated with the first distance range.

17. The method of claim 10, wherein the performing of the action comprises:
   generating image data using a camera of the A/V device; and
   sending the image data to a system.

18. The method of claim 10, wherein:
   the third data is further generated by a second sensor of the A/V device;
   the first sensor is associated with the first portion of the FOV;
   the second sensor is associated with the first distance range;
   the determining that the first motion occurred within the first distance range comprises:
      determining, based at least in part on the third data, that the second sensor detected the first motion; and
      determining that the first motion occurred within the first distance range based at least in part on the second sensor being associated with the first distance range; and
   the determining that the second motion occurred outside of the first distance range comprises determining, based at least in part on the third data, that the second sensor did not detect the second motion.

19. An electronic device comprising:
   one or more sensors;
   one or more processors; and
   one or more computer-readable media storing instructions that, when executed by the one or more processors, cause the electronic device to perform operations comprising:
      receiving first data representing at least:
         a first portion of a FOV of the electronic device; and
         a distance range associated with the first portion of the FOV;
      generating second data using the one or more sensors;
      detecting, based at least in part on the second data, first motion associated with the first portion of the FOV;
      determining, based at least in part on the second data, that the first motion occurred within the distance range;
      based at least in part on the detecting the first motion associated with the first portion of the FOV and the determining that the first motion occurred within the distance range, performing an action;
      generating third data using the one or more sensors;
      detecting, based at least in part on the third data, second motion associated with the first portion of the FOV;
      determining, based at least in part on the third data, that the second motion occurred outside of the distance range; and
      based at least in part on the determining that the second motion occurred outside of the distance range, refraining from again performing the action.

20. The electronic device of claim 19, wherein:
   the one or more sensors include:
   a first sensor that is associated with the first portion of the FOV; and
   a second sensor that is associated with a second portion of the FOV; and
   the detecting that the first motion is associated with the first portion of the FOV comprises:
   determining, based at least in part on the second data, that the first sensor detecting the first motion; and
   determining that the first sensor is associated with the first portion of the FOV.

* * * * *